United States Patent [19]
Nagano et al.

[11] Patent Number: 5,598,248
[45] Date of Patent: Jan. 28, 1997

[54] OPTICAL APPARATUS HAVING VISUAL POINT DETECTION FUNCTION

[75] Inventors: Akihiko Nagano, Kawasaki; Yasuo Suda, Yokohama; Kazuki Konishi, Tokyo, all of Japan

[73] Assignee: Canon Kabushiki Kaisha, Tokyo, Japan

[21] Appl. No.: 194,642

[22] Filed: Feb. 10, 1994

Related U.S. Application Data

[63] Continuation of Ser. No. 815,050, Dec. 31, 1991, abandoned.

[30] Foreign Application Priority Data

Jan. 8, 1991 [JP] Japan .................................. 3-011492

[51] Int. Cl.⁶ ........................... G03B 13/02; G03B 13/18
[52] U.S. Cl. ........................... 396/51; 396/296; 396/121
[58] Field of Search ........................... 354/62, 400, 402, 354/409, 429, 430, 432, 219, 474; 351/210

[56] References Cited

U.S. PATENT DOCUMENTS

| | | | |
|---|---|---|---|
| 4,836,670 | 6/1989 | Hutchinson | 351/210 |
| 5,036,347 | 7/1991 | Tsunekawa et al. | 354/400 |
| 5,428,413 | 6/1995 | Shindo | 354/400 |

FOREIGN PATENT DOCUMENTS

| | | |
|---|---|---|
| 61-172552 | 8/1986 | Japan . |
| 2177276 | 1/1987 | United Kingdom . |

*Primary Examiner*—W. B. Perkey
*Attorney, Agent, or Firm*—Fitzpatrick, Cella, Harper & Scinto

[57] ABSTRACT

An optical apparatus detects a visual point of an observer, and reduces the visual axis detection error due to anatomical differences between people, such as the difference in the size of the eye. The apparatus sequentially displays a plurality of marks in a finder, and can calculate a precise visual point position on the basis of errors between the calculated visual point position and the marks when the observer sequentially watches these marks.

18 Claims, 16 Drawing Sheets

OPTICAL APPARATUS HAVING VISUAL POINT DETECTION FUNCTION

This application is a continuation, of application Ser. No. 07/815,050 filed Dec. 31, 1991, now abandoned.

BACKGROUND OF THE INVENTION

1. Field of the Invention

The present invention relates to an optical apparatus having a visual axis detection device and, more particularly, to an optical apparatus having a visual axis detection device for detecting an axis in a watching point direction, i.e., a so-called visual axis, in which an observer (photographer) observes through a finder system, on an observation surface (focal plane) on which an object image is formed by a photographing system by utilizing a reflected image of an eye obtained when the eye surface of the observer is illuminated with light.

2. Related Background Art

Conventionally, various apparatus (e.g., eye cameras) for detecting a position, where an observer observes, on an observation surface, i.e., a so-called visual axis, have been proposed.

For example, in Japanese Patent Application Laid-Open No. 61-172552, a parallel light beam from a light source is projected onto a front eye portion of an eye of an observer, and a visual axis is obtained by utilizing a cornea reflected image formed by light reflected by a cornea, and a focusing position of a pupil. FIGS. 18A and 18B are explanatory views of the principle of a visual axis detection method. FIG. 18A is a schematic view showing principal part of a visual axis detection optical system, and FIG. 18B is an explanatory view showing the intensity of an output signal from a photoelectric transducer array 6 in FIG. 18A.

In FIG. 18A, a light source 5 comprises, e.g., a light-emitting diode for emitting infrared rays, that cannot be sensed by an observer, and is arranged on the focal plane of a projection lens 3.

Infrared rays emitted from the light source 5 are converted into parallel light by the projection lens 3, and the parallel light is then reflected by a half mirror 2, thus illuminating a cornea 21 of an eye 201. At this time, a cornea reflected image (virtual image) d formed by some infrared rays reflected by the surface of the cornea 21 is focused by a light-receiving lens 4 through the half mirror 2, and is then re-focused at a position Zd' on the photoelectric transducer array 6.

Light components from edge portions a and b of an iris 23 form images of the edge portions a and b at positions Za' and Zb' on the photoelectric transducer array 6 through the half mirror 2 and the light-receiving lens 4. When a rotational angle θ as an angle defined between the optical axis (optical axis $O_1$) of the light-receiving lens 4 and the optical axis (optical axis $O_2$) of the eye is small, if the z-coordinates of the edge portions a and b of the iris 23 are represented by Za and Zb, a coordinate Zc of the central position c of a pupil 24 is given by:

$$zc \approx (Za+Zb)/2$$

Since the z-coordinate of the cornea reflected image d coincides with the z-coordinate of a center of curvature O of the cornea 21, if the z-coordinate of a generation position d of the cornea reflected image is represented by Zd, and a distance from the center of curvature O of the cornea 21 to the center C of the pupil 24 is represented by $L_{OC}$, the rotational angle θ as an angle defined between the eye optical axis $O_2$ and the optical axis $O_1$ substantially satisfies the following relation:

$$L_{OC}* \text{SIN } \theta \approx Zc-Zd \qquad (1)$$

For this reason, an arithmetic means 9 can obtain the rotational angle θ of the optical axis $O_2$ of the eye 201 by detecting singular points (the cornea reflected image d and the edge portions a and b of the iris) projected onto the surfaces of the photoelectric transducer array 6, as shown in FIG. 18B. At this time, relation (1) is rewritten as:

$$\beta * L_{OC} * \text{SIN}\theta \approx \frac{Za'+Zb'}{2} - Zd' \qquad (2)$$

where β is the magnification determined by a distance L1 between the generation position d of the cornea reflected image and the light-receiving lens 4, and a distance L0 between the light-receiving lens 4 and the photoelectric transducer array 6.

The optical axis $O_2$ of the eye of the observer does not coincide with the visual axis. U.S. application Ser. No. 671,656 discloses a technique for detecting a visual axis by performing angular compensation between the optical axis of an eye of an observer, and the visual axis. In this technique, a horizontal rotational angle θ of the optical axis of the eye of the observer is calculated, and when an angular compensation value between the optical axis of the eye and the visual axis is represented by δ, a horizontal visual axis θH of the observer is calculated as:

$$\theta H = \theta \pm \delta \qquad (3)$$

As for the sign ±, if the clockwise rotational angle in association with the observer is assumed to be a positive angle, when the eye of the observer at an observation apparatus is his or her left eye, the sign "+" is selected; otherwise, the sign "−" is selected.

FIG. 18A exemplifies a case wherein the eye of the observer is rotated within the Z-X plane (e.g., the horizontal plane). The same applies to a case wherein the eye of the observer is rotated within the X-Y plane (e.g., the vertical plane).

In this case, since the vertical component of the visual axis of the observer coincides with a vertical component θ' of the optical axis of the eye, a vertical visual axis θV is given by:

$$\theta V = \theta' \qquad (4)$$

FIG. 19 is a schematic view of principal part of an optical system when the visual axis detection device shown in FIG. 18 is applied to a portion of a finder system of a single-lens reflex camera.

In FIG. 19, object light transmitted through a photographing lens 101 is reflected by a quick return mirror 102, and is focused near the focal plane of a focusing screen 104. The object light diffused by the focusing screen 104 becomes incident on an eye point 201a of a photographer through a condenser lens 105, a pentagonal prism 106, and an eyepiece lens 1 having a light splitting surface 1a.

A visual axis detection optical system is constituted by an illumination means (optical axis $O_3$) including the light source 5 comprising, e.g., an infrared light-emitting diode, that cannot be sensed by a photographer (observer), and the projection lens 3, and a light-receiving means (optical axis $O_1$) including the photoelectric transducer array 6, the half mirror 2, and the light-receiving lens 4. The optical system is arranged above the eye-piece lens 1 having the light splitting surface 1a comprising a dichroic mirror. Infrared rays emitted from the infrared light-emitting diode 5 are reflected by the light splitting surface 1a, and illuminate an eye an 201 of a photographer. Furthermore, some infrared rays reflected by the eye 201 are reflected by the light splitting surface 1a again, and are then focused on the photoelectric transducer array 6 through the light-receiving lens 4 and the half mirror 2. The arithmetic means 9 calculates the direction of visual axis of the photographer on the basis of image information of the eye (e.g., an output signal shown in FIG. 18B) obtained on the photoelectric transducer array 6. More specifically, a point (visual point) on the focusing screen 104 observed by the observer is obtained.

In this case, the position (Zn, Yn) on the focusing screen 104 observed by the observer is calculated as follows on the basis of the horizontal and vertical visual axes θH and θV described above.

$$Zn = m*\theta H \\ Yn = m*\theta V \quad \} \quad (5)$$

where m is a constant determined by the finder system of the camera.

When the position, observed by the photographer, on the focusing screen 104 in the single-lens reflex camera can be detected in this manner, the following effect can be obtained. That is, when focusing points are arranged not only at the center of the screen but also at a plurality of positions on the screen in, e.g., an automatic focus detection device of a camera, and when a photographer selects one of these points to perform focus detection, an operation for selecting and inputting one point can be omitted, and the point observed by the photographer, i.e., a watching point, is regarded as a point to be subjected to focus detection. Thus, the point can be automatically selected to perform automatic focus detection.

In general, many people use cameras irrespective of age or sex, and photographers using the cameras have different size l of eyes. In the above-mentioned visual axis detection method, relation (2) for calculating the rotational angle θ of an eye includes a parameter $L_{OC}$ (the distance from the center of curvature O of the cornea 21 to the center C of the pupil 24) associated with the size of the eye. For this reason, when the size of the eye of a person who uses a camera, i.e., the parameter $L_{OC}$ is considerably offset from a value corresponding to the predetermined distance $L_{OC}$, the calculated rotational angle θ of the eye becomes different from an actual rotational angle of the eye, thus impairing visual axis detection precision.

Furthermore, the compensation angle δ between the optical axis of the eye and the visual axis in equation (3) also varies depending on characteristics such as the size of the eye of the photographer. For this reason, when the compensation angle is set to be a constant value, a difference between the calculated direction of visual axis θH and an actual direction of visual axis is generated depending on photographers, thus also impairing visual axis detection precision.

In a commercially available eye camera for measuring the visual axis, a personal differences of different users is compensated for. However, since the optical axis of the eye of the user does not coincide with the optical axis of a camera for photographing a landscape that is supposed to be seen by the user, a target observed by the user must be separated from the eye camera, and the target cannot be integrated with the eye camera.

Furthermore, in order to adjust the eye camera, so that the position of the target photographed by the camera and displayed on a television monitor coincides with the position of the visual axis detected when the observer watches the target, an experimental assistant is needed, resulting in the persing of a cumbersome adjustment.

SUMMARY OF THE INVENTION

It is an object of the present invention to provide an optical apparatus having a visual axis detection device, which can automatically compensate for a detection error of a visual axis due to personal differences, e.g., differences in sizes of eyes by using a properly set visual axis compensation means, and can detect the visual axis with high precision.

It is another object of the present invention to improve precision of an apparatus disclosed in U.S. application Ser No. 671,656 described above.

It is still another object of the present invention to provide an apparatus, with which an observer can easily perform visual axis compensation by a simple operation.

In addition, the present invention is characterized in that the visual axis compensation means comprises a visual axis compensation execution switch, an intra-finder display means, a visual axis compensation arithmetic means, and a visual axis compensation data storage means, the visual axis compensation means comprises a visual axis compensation confirmation means, and the intra-finder display means has flickering targets for detecting the visual axis at least at two positions in a finder.

DESCRIPTION OF THE PREFERRED EMBODIMENTS

Figure 1A:
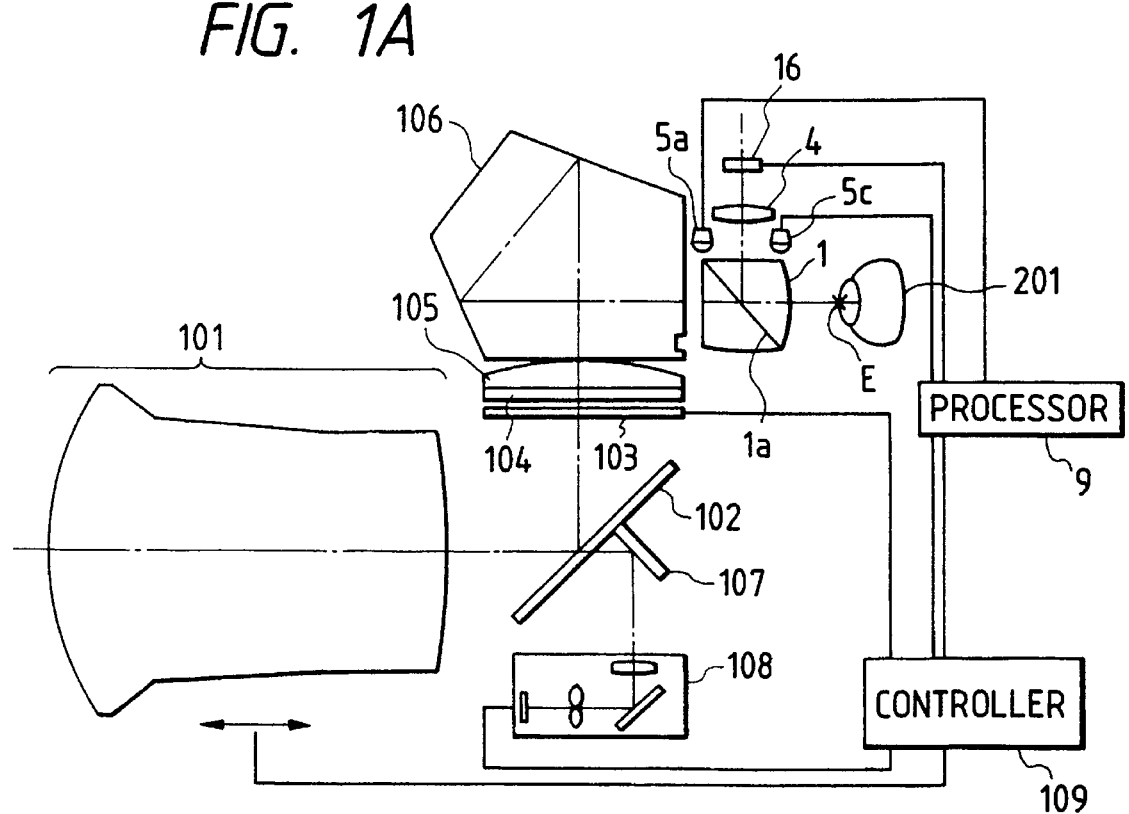
FIG. 1A is a schematic view showing the first embodiment wherein the present invention is applied to a single-lens reflex camera.
Figure 1B:
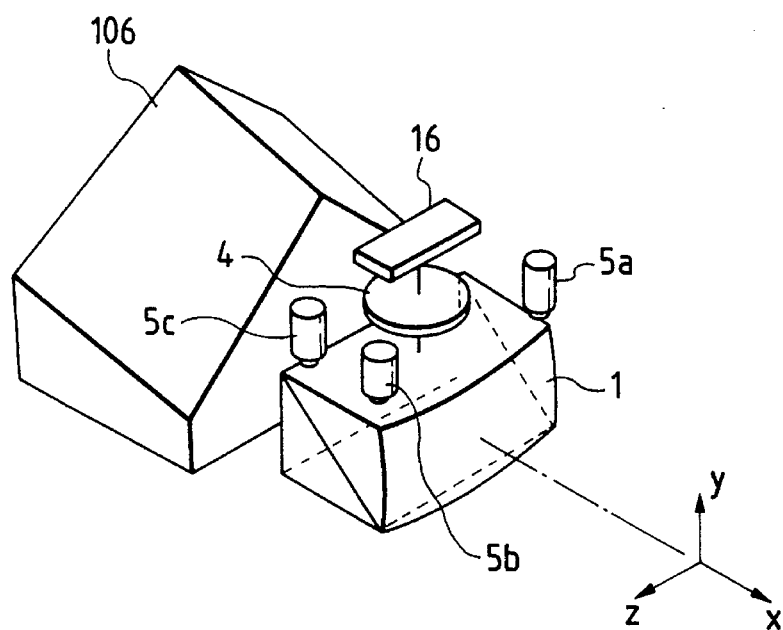
FIG. 1B is a schematic view showing principal part of a visual axis detection device according to the present invention.
Figure 2:
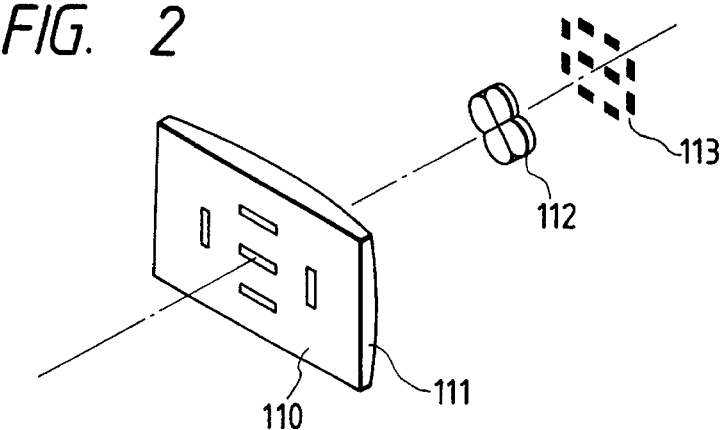
FIG. 2 is a perspective view showing principal part of a focus detection device shown in FIG. 1A.
Figure 3A:
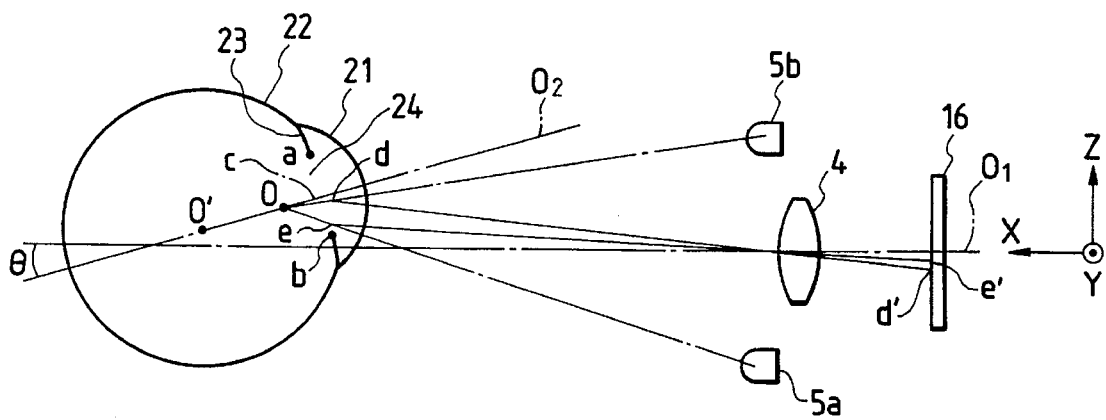
FIG. 3A is an explanatory view of the principle of visual axis detection.
Figure 3B:
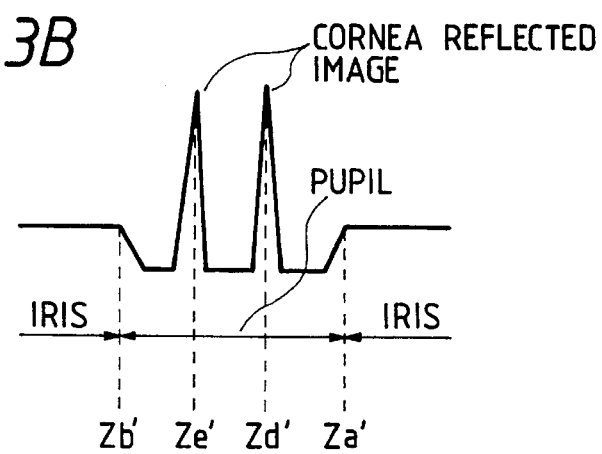
FIG. 3B is a graph showing the output intensity of an image sensor shown in FIG. 3A.
Figure 4:
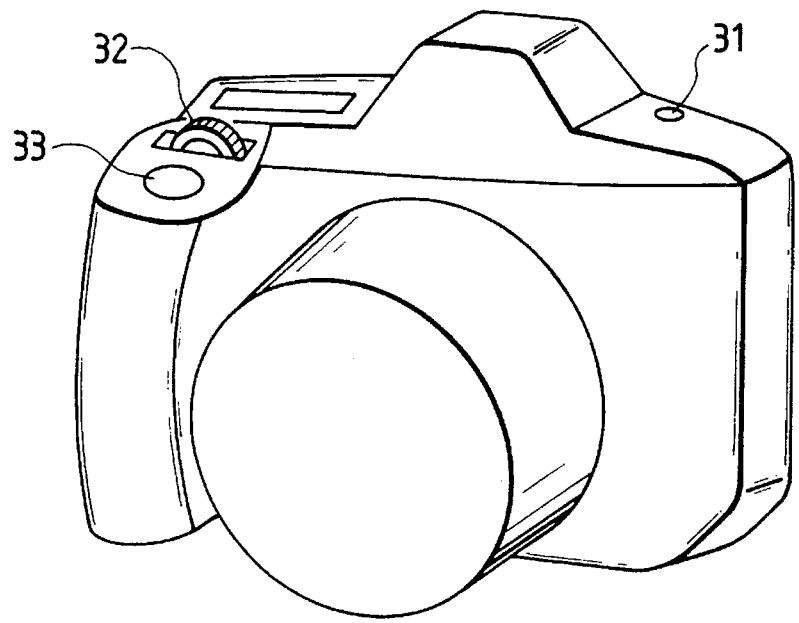
FIG. 4 is a perspective view showing the outer appearance of a single-lens reflex camera according to the present invention.

FIG. 1A is a schematic view showing the principal part of an optical system according to the first embodiment wherein an apparatus of the present invention is applied to a single-lens reflex camera, and FIG. 1B is a partial explanatory view of FIG. 1A. FIG. 2 is a schematic view showing the principal part of a portion of an automatic focus detection device shown in FIG. 1A, FIG. 3A is an explanatory view of the principle of a visual axis detection method according to the present invention, FIG. 3B is a graph for explaining the output intensity from an image sensor shown in FIG. 3A, and FIG. 4 is a front perspective view of a single-lens reflex camera.

In FIGS. 1A and 1B, an eye-piece lens 1 comprises a dichroic mirror 1a for transmitting visible light and reflecting infrared rays. The dichroic mirror 1a is obliquely arranged in the lens 1, and also serves as an optical path splitter. A light-receiving lens 4 is arranged above the lens 1, and illumination means 5 (5a, 5b, and 5c) are arranged between the lenses 1 and 4. The illumination means 5 comprises a light-emitting diode for emitting infrared rays, which cannot be sensed by an observer. An image sensor 16 is arranged above the light-receiving lens 4. The light-receiving lens 4 and the image sensor 16 constitute one element of a light-receiving means.

The image sensor 16 has an arrangement wherein photoelectric transducer arrays are two-dimensionally arranged, and is arranged at a position conjugate with a position near a pupil of an eye, which is located at a predetermined position (a general eye-point position of a photographer who does not wear glasses) with respect to the light-receiving lens 4 and the eye-piece lens 1.

A visual axis arithmetic processor 9 has a visual axis compensation arithmetic function, a visual axis compensation data storage function, a visual axis arithmetic function, and a control function of the infrared light-emitting diodes 5a, 5b, and 5c. The components 1, 4, 5, and 16 constitute a visual axis detection means of an eye.

The single-lens reflex camera of this embodiment comprises a photographing lens 101, a quick return (QR) mirror 102, a display element 103, a focusing screen 104 located at a position equivalent to a film surface, a condenser lens 105 located at substantially the same position as the focusing screen, a pentagonal prism 106, a sub mirror 107, and a multi-point focus detection device 108, which selects one of a plurality of areas in a photographing frame to perform focus detection.

The multi-point focus detection device will be described only briefly since it is not necessary for understanding of the present invention. More specifically, in this embodiment, as shown in FIG. 2, a field mask 110 arranged at a position near a prospective focal plane of the photographing lens 101 (i.e., a position equivalent to the film surface) and having a plurality of slits for respectively determining ranging areas, and a lens member 111 for offering a field lens effect for images in the slits are arranged adjacent to each other. Furthermore, a set 112 of re-focusing lenses, and a set 113 of photoelectric transducer arrays, corresponding to the number of slits, are arranged in the order named. The slits (field mask) 110, the field lens (lens member) 111, and the set 112 of re-focusing lenses, and the set 113 of photoelectric transducer arrays constitute a known focus detection system. A camera controller 109 has an intra-finder display element drive function, a focus detection arithmetic function, a lens drive function, and the like.

In this embodiment, some light components of object light transmitted through the photographing lens 101 are reflected by the QR mirror 102, and form an object image near the focusing screen 104. The object light diffused by the diffusion surface of the focusing screen 104 is optically guided to an eye point E through the condenser lens 105, the pentagonal prism 106, and the eye-piece lens 1.

Figure 5:
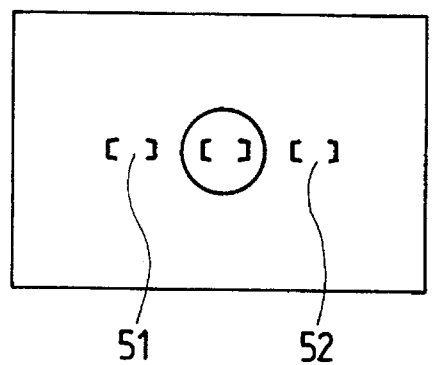
FIG. 5 is a view showing a visual field of a finder.

The display element 103 comprises, e.g., a two-layered type Guest-Host liquid crystal element not using a polarizing plate, and also servers as a visual axis compensation intra-finder display means. As shown in FIG. 5, the display element 103 displays ranging areas (focus detection positions) also serving as targets (areas 51 and 52) as one element of a visual axis compensation means in the finder visual field.

Some other light components of object light transmitted through the photographing lens 101 are transmitted through the QR mirror 102, are reflected by the sub mirror 107, and are then optically guided to the above-mentioned multi-point focus detection device 108 arranged in the bottom portion of a camera main body. A photographing lens driver (not shown) extends (or collapses) the photographing lens 101 on the basis of focus detection information of a position on an object plane selected by the multi-point focus detection device 108 based on a signal from the camera controller 109, thereby executing a focusing operation.

A visual axis detection device according to this embodiment comprises a visual axis detection means constituted by the members 1, 4, 5, and 16, and the visual axis arithmetic processor 9 for calculating a visual axis.

In the visual axis detection means, infrared rays emitted from the infrared light-emitting diodes 5a, 5b, and 5c become incident on the eye-piece lens 1 from above in FIG. 1A, and are reflected by the dichroic mirror 1a. The reflected rays illuminate an eye 201 of an observer, located near the eye point E. The infrared rays reflected by the eye 201 are reflected by the dichroic mirror 1a, and form an image on the image sensor 16 while being converged by the light-receiving lens 4. The visual axis arithmetic processor 9 is executed based on a software program of a microcomputer.

Watching point information detected by the visual axis arithmetic processor 9 is primarily transferred to the display element 103 and the multi-point focus detection device 108 through the camera controller 109. The display element 103 displays, in the finder, a position where the observer watches, so as to confirm the watching point (focus detection point).

The multi-point focus detection device 108 performs focus detection of the point observed by the observer, and performs a focusing operation for an observed object.

As shown in FIG. 1B, the illumination infrared light-emitting diodes 5a, 5b, and 5c are used in pairs so as to detect a distance between the camera and the eye of the observer. According to the camera position, the infrared light-emitting diodes 5a and 5b detect a horizontal position, and the infrared light-emitting diodes 5b and 5c detect a vertical position. Although not shown, a camera position detection means utilizing, e.g., a mercury switch, is effectively used.

The visual axis detection method will be described below with reference to FIGS. 3A and 3B. The infrared light-emitting diodes 5a, 5b, and 5c are substantially symmetrically arranged in the z-direction with respect to an optical axis $O_1$, and respectively divergently illuminate the eye of a photographer.

Infrared rays emitted from the infrared light-emitting diode 5b illuminate a cornea 21 of the eye. At this time, a cornea reflected image d formed by some infrared rays reflected by the surface of the cornea 21 is focused by the light-receiving lens 4, and is re-focused at a position d' on the image sensor 16.

Similarly, infrared rays emitted from the infrared light-emitting diode 5a illuminate the cornea 21 of the eye. At this time, a cornea reflected image e formed by some infrared rays reflected by the surface of the cornea 21 is focused by the light-receiving lens 4, and is re-focused at a position e' on the image sensor 16.

Light components from edge portions a and b of an iris 23 form images of the edge portions a and b at positions a' and b' on the image sensor 16 through the light-receiving lens 4. When the rotational angle θ of an optical axis $O_2$ of the eye with respect to the optical axis (optical axis $O_1$) of the light-receiving lens 4 is small, if the z-coordinates of the edge portions a and b of the iris 23 are represented by Za and Zb, a coordinate Zc of a central position c of a pupil 24 is expressed by:

$$Zc \cong (Za+Zb)/2$$

Since the z-coordinate of the middle point between the cornea reflected images d and e coincides with the z-coordinate Zo of a center of curvature O of the cornea 21, if the z-coordinates of generation positions d and e of the cornea reflected images are represented by Zd and Ze, the standard distance from the center of curvature O of the cornea 21 to a center C of the pupil 24 is represented by $L_{OC}$, and the coefficient for considering a personal difference for the distance $L_{OC}$ is represented by A1, the rotational angle θ of the optical axis $O_2$ of the eye substantially satisfies the following relation:

$$(A1*L_{OC})* \sin \theta \cong Zc-(Zd+Ze)/2 \tag{6}$$

For this reason, the visual axis arithmetic processor 9 detects the positions of singular points (the cornea reflected images d and e, and the edge portions a and b of the iris) projected on a portion of the image sensor 16, as shown in FIG. 3B, thereby obtaining the rotational angle θ of the optical axis $O_2$ of the eye. In this case, relation (6) can be rewritten as:

$$\beta(A1*L_{OC})* \sin \theta \cong (Za'+Z'b)/2-(Zd'+Ze')/2 \tag{7}$$

where β is the magnification determined by the position of the eye with respect to the light-receiving lens 4, and is substantially obtained as a function of an interval |Zd'−Ze'| of the cornea reflected image. The rotational angle θ of the eye can be rewritten as:

$$\theta \cong ARC \, SIN \, \{(Zc'-Zf')/\beta/(A1*L_{OC})\} \tag{8}$$

for $$Zc' \cong (Za'+Zb')/2$$

$$Zf' \cong (Zd'+Ze')/2$$

Since the optical axis of the eye of the photographer does not coincide with the visual axis, when the horizontal rotational angle θ of the optical axis of the eye of the photographer is calculated, angular compensation δ is performed between the optical axis of the eye and the visual axis to obtain a horizontal visual axis θH of the photographer. When a coefficient for considering the personal difference of the optical axis of the eye and the visual axis for a compensation angle δ is represented by B1, the horizontal visual axis θH of the photographer is given by:

$$\theta H \cong \theta \pm (B1*\delta) \tag{9}$$

As for the sign ±, if the clockwise rotational angle in association with the observer is assumed to be a positive angle, when the eye of the observer at an observation apparatus is his or her left eye, the sign "+" is selected; otherwise, the sign "−" is selected.

FIG. 3A exemplifies a case wherein the eye of the observer is rotated within the Z-X plane (e.g., the horizontal plane). The same applies to a case wherein the eye of the observer is rotated within the X-Y plane (e.g., the vertical plane). In this case, since the vertical component of the visual axis of the photographer coincides with a vertical component θ' of the optical axis of the eye, a vertical visual axis θV is given by:

$$\theta V = \theta'$$

Furthermore, based on the visual axis data θH and θV, a position (Zn, Yn), observed by the photographer, on the focusing screen can be obtained as follows:

$$\begin{aligned} Zn &= m*\theta H \\ &= m*[ARCSIN\{(Zc'-Zf')/\beta/(A1*L_{OC})\} \pm \\ &\quad (B1*\delta)] \\ Yn &= m*\theta V \end{aligned} \tag{10}$$

where m is a constant determined by the finder optical system of the camera.

The values of the coefficients A1 and B1 for compensating for the personal difference of the eye of the photographer are obtained as follows. The photographer watches a target arranged at a predetermined position in the finder of the camera, and the position of the target is caused to coincide with the position of the watching point calculated according to relations (10).

Figure 6:
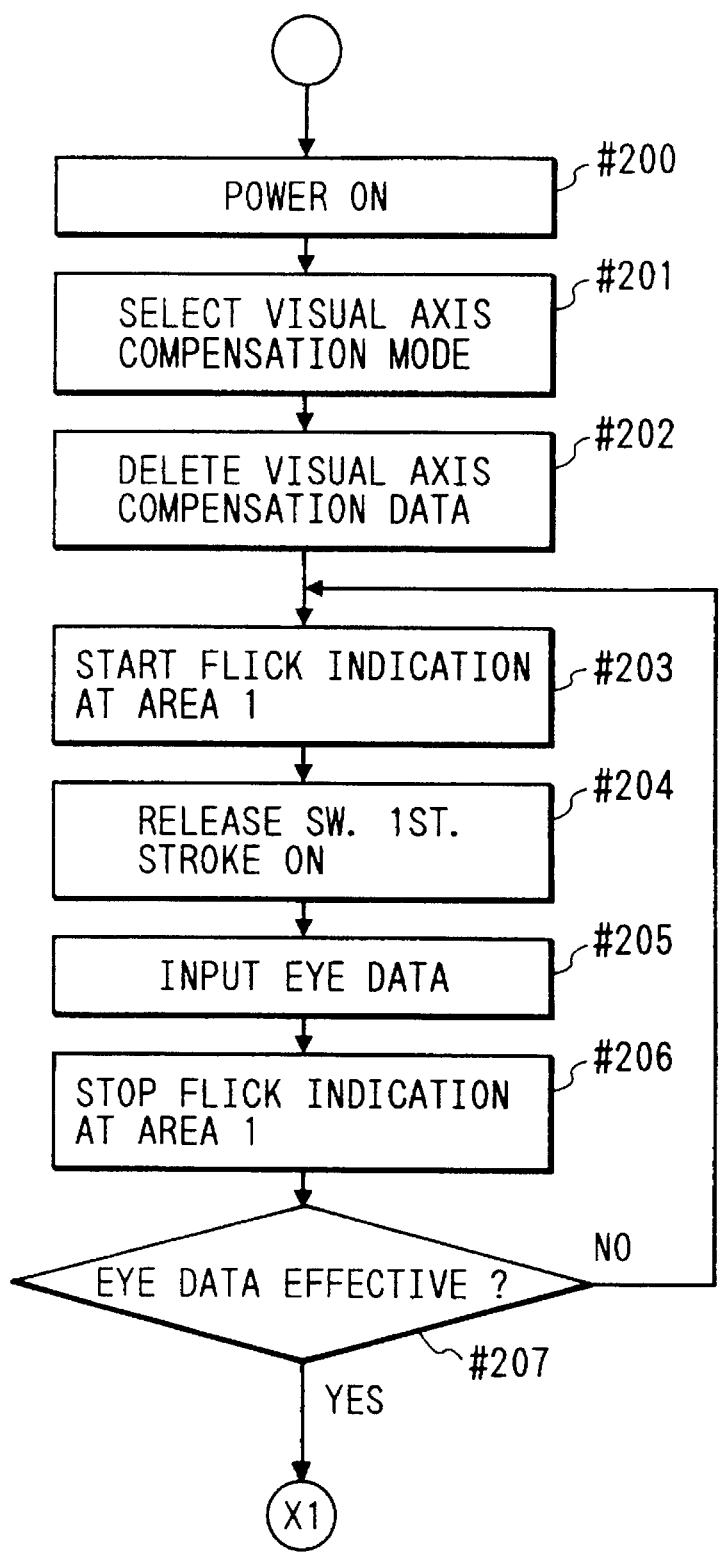
FIG. 6 is a flow chart showing visual axis compensation according to the present invention.
Figure 7:
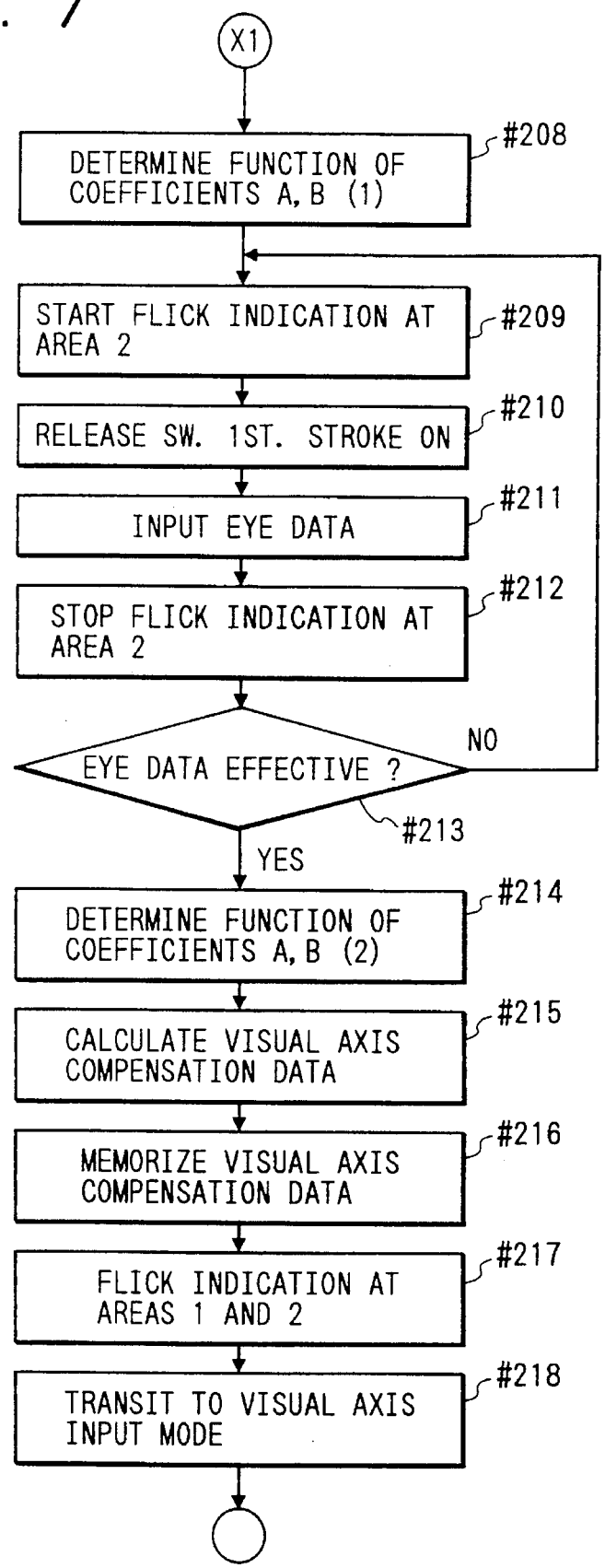
FIG. 7 is a flow chart showing visual axis compensation according to the present invention.

In this embodiment, arithmetic operations for obtaining the visual axis and the watching point of the photographer are executed based on a software program of a microcomputer in the visual axis arithmetic processor 9 on the basis of the above-mentioned relations. The visual axis compensation method of this embodiment will be explained below with reference to FIG. 4, and FIGS. 6 and 7 showing the flow charts of visual axis compensation.

As shown in FIG. 4, the camera of this embodiment comprises a mode selection button 31, and an electronic dial 32 which also serves as a visual axis compensation execution switch. Upon operations of these members, visual axis compensation is executed. The camera also has a release switch 33.

After a power switch (not shown) of the camera is turned on (#200), when the photographer selects a visual axis compensation mode using the electronic dial 32 while depressing the mode selection button 31 (#201), visual axis compensation data stored in the visual axis arithmetic processor 9 is deleted (#203), and new visual axis compensation is started.

The infrared light-emitting diodes 5 for visual axis detection are turned on in response to a signal from the visual axis arithmetic processor 9, and begin to illuminate the eye of the photographer. In addition, flickering indication at the area 51 of the intra-finder display means shown in FIG. 5 is started in response to a signal from the camera controller 109 (#203). In this case, the target for visual axis compensation is used commonly as a focusing indication mark in an automatic focus detection mode. For this reason, although the target is displayed at the same position as the focusing indication mark, the focusing indication mark is continuously displayed only when the focusing state of the photographing lens 101 is an in-focus state. For this reason, the photographer can distinguish the visual axis compensation mode from the in-focus state display mode based on the display state of the mark.

When the photographer recognizes that the target for visual axis compensation is being displayed in the visual field of the finder, and depresses the release switch 33 to the first stroke while watching the display area 51 (#204), eye image data at that time is input to the visual axis arithmetic processor 9 (#205), and the visual axis arithmetic processor 9 checks if the eye image data is effective (#207). When the eye image data is input to the visual axis arithmetic processor 9, the flickering indication at the area 51 in the finder is ended (#206).

In recent cameras, when the release switch 33 is depressed to the first stroke, an automatic focusing function of a photographing lens, a photometric function, and the like are enabled. However, when the visual axis compensation mode is selected, these functions may be inhibited. If the visual axis arithmetic processor 9 determines that cornea reflected images or iris images cannot be detected based on the eye image data, flickering indication at the area 51 in the finder is restarted (#203).

On the other hand, if it is determined that the eye image data is effective (#207), the visual axis arithmetic processor 9 determines a function of the coefficients A1 and B1 as follows (#208):

$$Z1 \equiv m*[ARC\ SIN\ \{(Zc1'-Zf1')/\beta/(A1*L_{OC}\}\pm(B1*\delta)] \quad (11)$$

where Z1 is the coordinate in the horizontal direction (z-direction) on the focusing screen of the display area 51 in the finder, Zc1' is the central coordinate (z-direction) of the pupil at that time, and Zf1' is the middle-point coordinate (z-direction) of the two cornea reflected images.

When the function of the visual axis compensation coefficients A1 and B1 is determined, a flickering indication at the area 52 in the finder shown in FIG. 5 is started in response to a signal from the camera controller 109 (#209). When the photographer recognizes that the target for visual axis compensation is being displayed in the visual field of the finder, and turns on the first stroke of the release switch 33 while watching the display area 52 (#210), eye image data at that time is input to the visual axis arithmetic processor 9 (#211), and the visual axis arithmetic processor 9 checks if the eye image data is effective (#213). When the eye image data is input to the visual axis arithmetic processor 9, the flickering indication at the area 52 in the finder is ended (#212).

If the visual axis arithmetic processor 9 determines that cornea reflected images or iris images cannot be detected based on the eye image data, the flickering indication at the area 52 in the finder is restarted (#209).

On the other hand, if it is determined that the eye image data is effective (#213), the visual axis arithmetic processor 9 determines a function of the coefficients A1 and B1 as follows (#214):

$$Z2 \equiv m*[ARC\ SIN\ \{(Zc2'-Zf2')/\beta/(A1*L_{OC}\}\pm(B1*\delta)] \quad (12)$$

where Z2 is the coordinate in the horizontal direction (z-direction) on the focusing screen of the display area 52 in the finder, Zc2' is the central coordinate (z-direction) of the pupil at that time, and Zf2' is the middle-point coordinate (z-direction) of the two cornea reflected images.

When two relations (11) and (12) for the visual axis compensation coefficients A1 and B1 are determined, the visual axis arithmetic processor 9 also serving as the visual axis compensation arithmetic means solves relations (11) and (12), thereby calculating the visual axis compensation coefficients (visual axis compensation data) A1 and B1 of the photographer (#215). The calculated visual axis compensation data are stored in the visual axis arithmetic processor 9 also serving as the visual axis compensation data storage means (#216). At this time, data of the photographer who performed the visual axis compensation can also be simultaneously stored in the visual axis arithmetic processor 9. In this manner, visual axis compensation need not be repeated once the visual axis compensation is performed.

When the visual axis compensation data are stored in the visual axis arithmetic processor 9, flickering indication at the areas 51 and 52 in the finder is performed for a predetermined period of time so as to inform to the photographer that the visual axis compensation is completed (#217). Thereafter, the control transits to a visual axis input mode (#218). In the visual axis input mode, the visual axis of the photographer can be detected with high precision using the previously calculated visual axis compensation data. Therefore, information according to the photographer's will, e.g., the position of an object to be focused and photographed by the photographer, can be input to the camera on the basis of the visual axis of the photographer.

In this embodiment, the visual axis compensation mode is selected after power-on. However, for a photographer who has already registered the visual axis compensation data in the camera, the visual axis input mode can be immediately started without executing the visual axis compensation.

In this embodiment, compensation of the distance $L_{OC}$ in correspondence with a personal difference is performed by multiplying the distance $L_{OC}$ with a constant. However, the compensation may be performed by performing addition or subtraction between ($L_{OC}$+A1) and the constant A1.

Similarly, in this embodiment, compensation of the compensation angle δ between the optical axis of the eye and the visual axis in correspondence with a personal difference is performed by multiplying the compensation angle δ with a constant. However, the compensation may be performed by performing addition or subtraction between (δ+B1) and the constant B1.

Figure 8A:
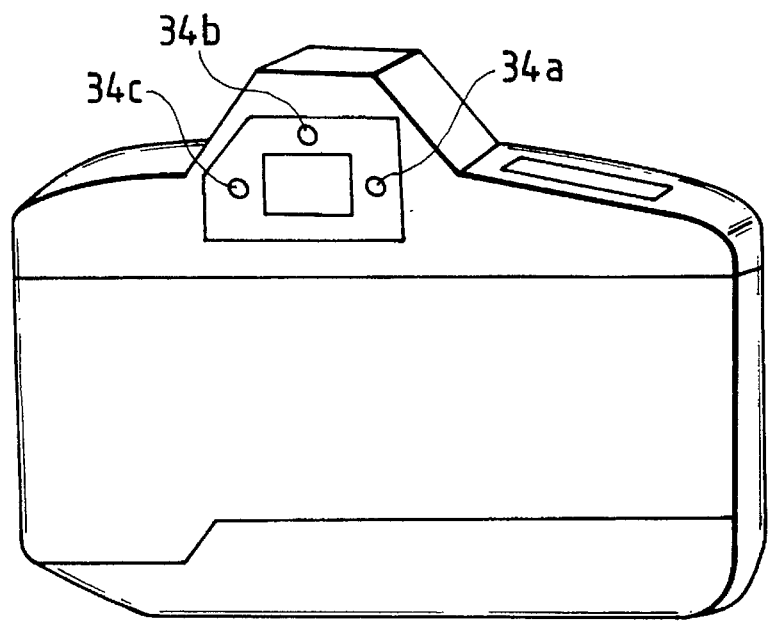
FIG. 8A is a rear view showing the outer appearance of the second embodiment wherein the present invention is applied to a single-lens reflex camera.
Figure 8B:
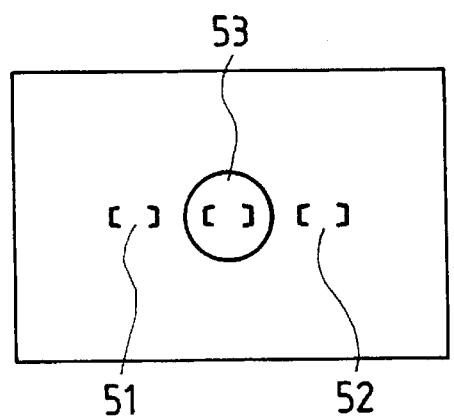
FIG. 8B is a view showing a visual field in a finder in FIG. 8A.
Figure 9A:
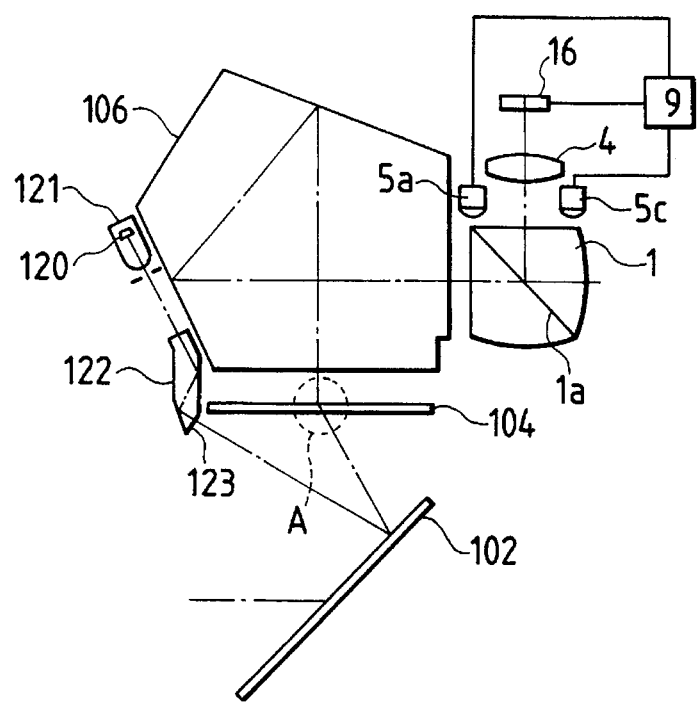
FIG. 9A is an explanatory view of the principle of intra-finder display according to the second embodiment.
Figure 9B:
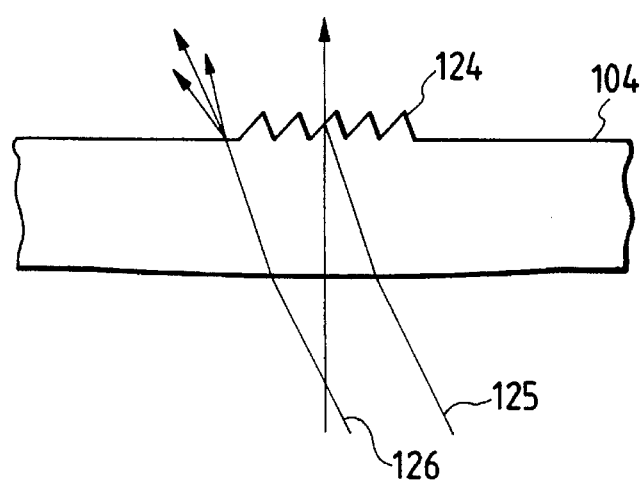
FIG. 9B is an enlarged view of a focusing screen shown in FIG. 9A.
Figure 10:
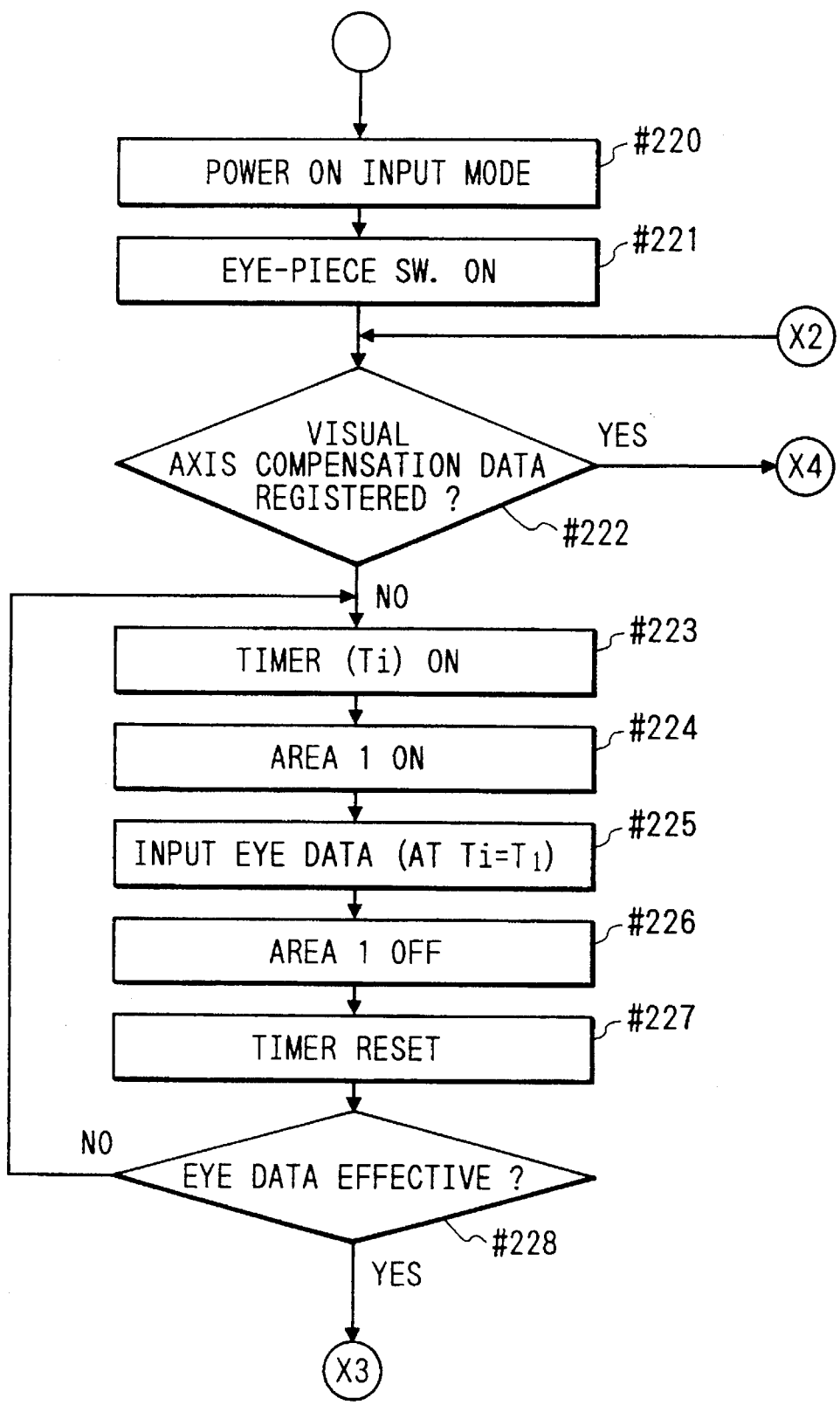
FIG. 10 is a flow chart showing visual axis compensation of the second embodiment.

FIG. 8A is a rear view showing the outer appearance of a camera according to the second embodiment of the present invention, FIG. 8B is a view showing a visual field in a finder in the second embodiment, FIGS. 9A and 9B are partial sectional views of principal part of the second embodiment, and FIG. 10 is a flow chart of the second embodiment.

Note that the visual axis detection device of this embodiment is the same as that shown in FIG. 2. In FIG. 8A, eye-piece switches 34a, 34b, and 34c are constituted by, e.g., touch sensors embedded in an eye-piece cap or the like, and are operated when a photographer looks in the finder.

The eye-piece switches also serve as visual axis compensation execution switches. If visual axis compensation data of a photographer is not registered in a visual axis arithmetic processor 9 serving as a visual axis compensation data storage means, visual axis compensation is executed.

In this embodiment, three focusing indication marks (areas 51, 52, and 53), which also serve as targets for visual axis compensation, are set in a visual field of the finder, as shown in FIG. 8B. FIGS. 9A and 9B are explanatory views for explaining the principle of display of an intra-finder display means for displaying the three focusing indication marks serving as the targets for visual axis compensation in the visual field of the finder. The same reference numerals in FIGS. 9A and 9B denote the same parts as in FIG. 1.

In FIG. 9A, a condenser lens is omitted from the illustration. A display light-emitting diode 120, a package 121 for holding the display light-emitting diode 120, a projection lens 122, a Fresno lens portion 123 of the projection lens 122, and a prism 124 constitute one display unit. Three display units are arranged in a direction perpendicular to the drawing surface of FIG. 9A in correspondence with the areas 51, 52, and 53 shown in FIG. 8B. One package 121 is assembled with two light-emitting diodes having different emission wavelengths, so that display colors are changed between a case wherein the targets for visual axis compensation are displayed, and a case wherein a focusing state of a photographing lens is displayed. The principle of display will be briefly described hereinafter.

When the light-emitting diode 120 corresponding to the display area is turned on according to a signal from a camera controller (not shown), illumination light is reflected twice by the projection lens 122, and then reaches a focusing screen 104 through the fresnel lens 123 and a quick return mirror 102. At this time, the fresnel lens 123 operates, so that the illumination light effectively illuminates the predetermined display area.

FIG. 9B is an enlarged view of an area A indicated by a dotted line shown in FIG. 9A. Illumination light components 125 reflected by the quick return mirror 102 are refracted by the prism 124 formed on the display area shown in FIG. 8B, and are then guided to an eye point of a photographer through a pentagonal prism 106 and an eye-piece lens 1.

On the other hand, illumination light components 126, which become incident on a diffusion area on the focusing screen 104 where no prism 124 is formed, emerge from the focusing screen 104 while being diffused. However, since the angle of incidence of the illumination light components 126 into the focusing screen 104 is large, there are almost no components of diffused light, which are guided to the eye point of the photographer through the pentagonal prism 106 and the eye-piece lens 1. As a result, the photographer can visually recognize only light components from the area of the prism 124 formed on the focusing screen 104, and these light components serve as the focusing indication marks of the photographing lens, which marks are also used as the targets for visual axis compensation.

Figure 11:
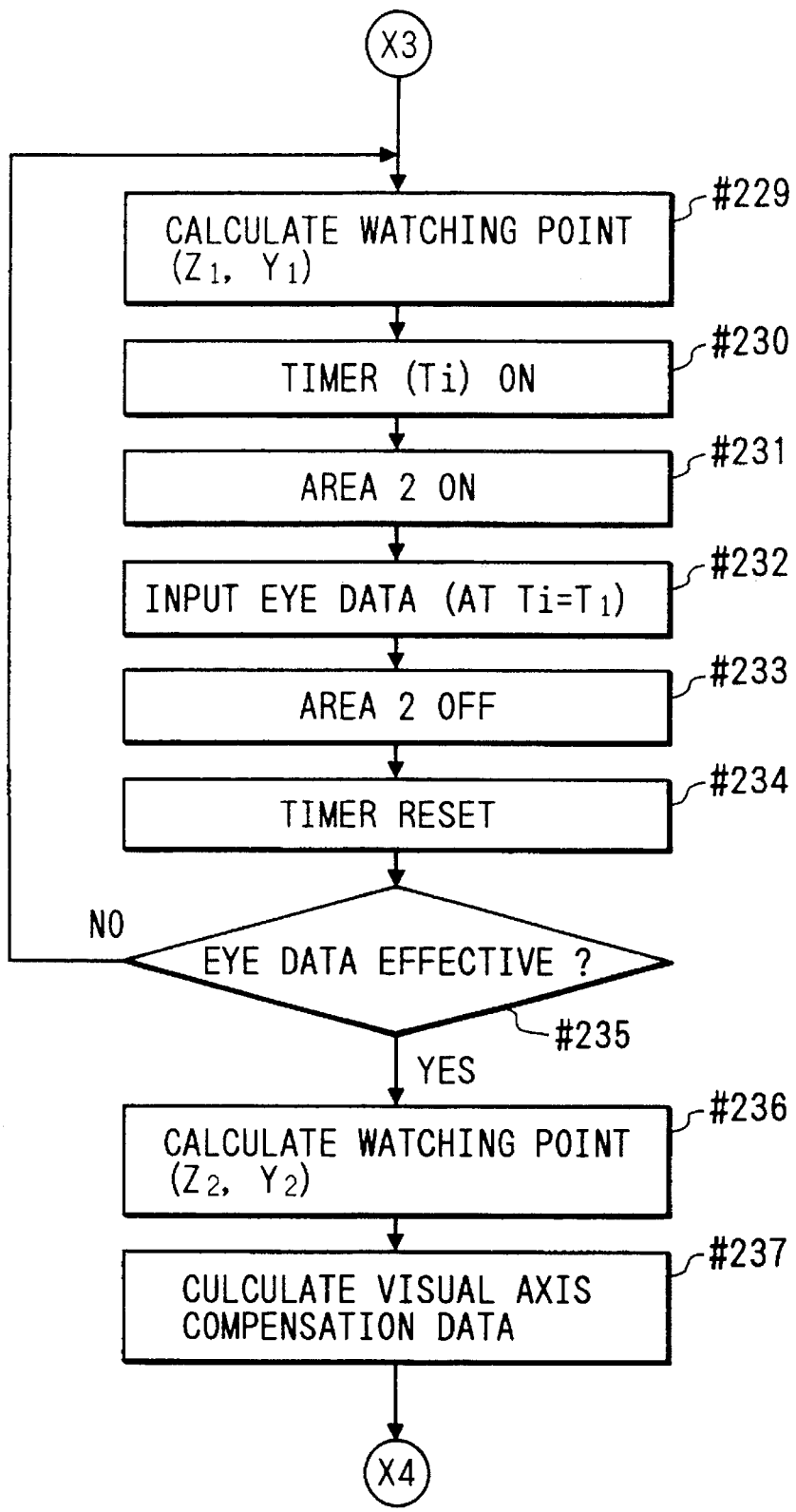
FIG. 11 is a flow chart showing visual axis compensation of the second embodiment.
Figure 12:
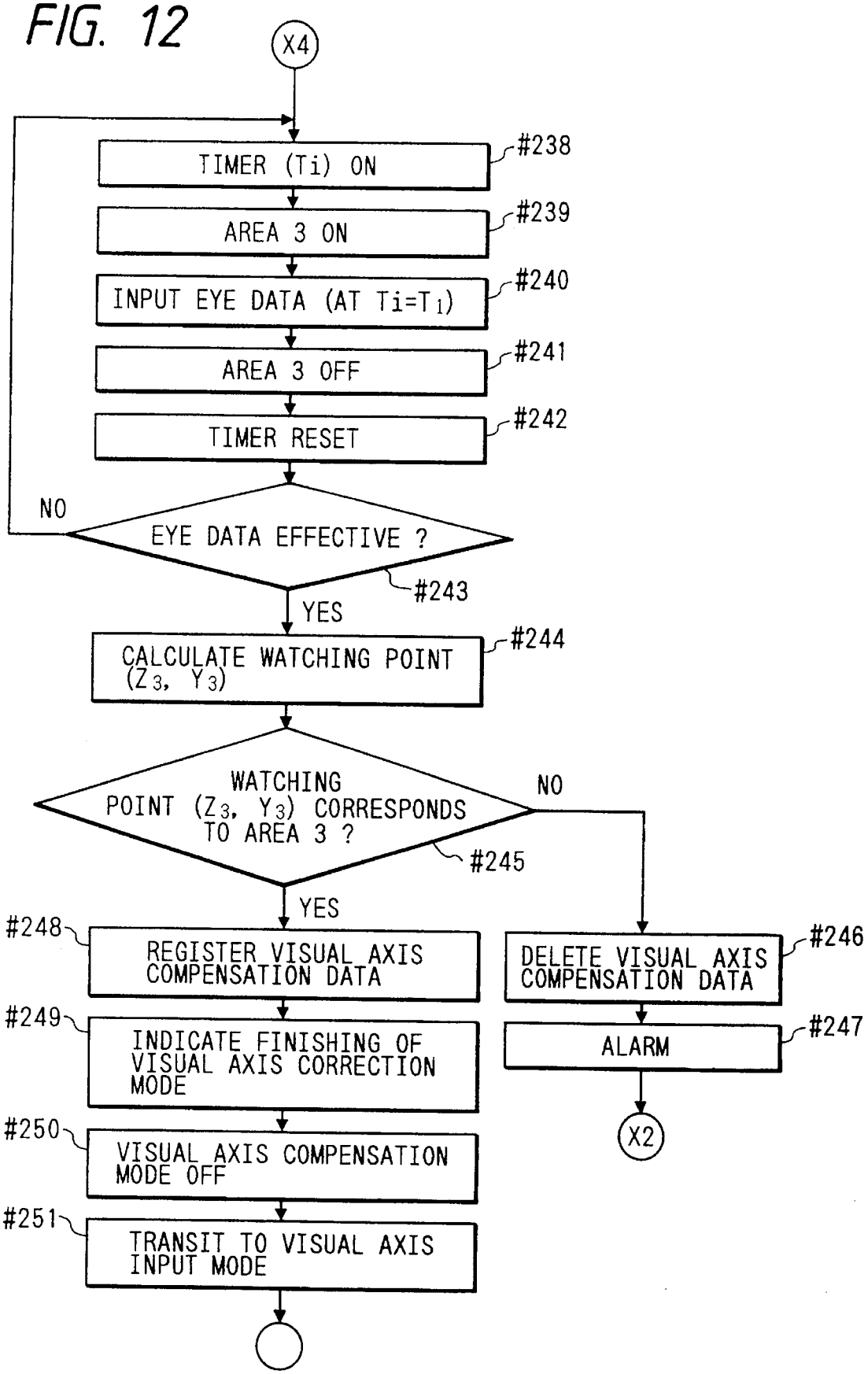
FIG. 12 is a flow chart showing visual axis compensation of the second embodiment.

The visual axis compensation method of this embodiment will be described below with reference to FIGS. 8A and 8B, and the flow charts of visual axis compensation shown in FIGS. 10, 11, and 12.

When the photographer turns on a power switch (not shown) of the camera, sets a visual axis input mode (#220), and then looks in the finder, at least one of the eye-piece switches 34a, 34b, and 34c embedded in the eye-piece cap is turned on (#221), and infrared light-emitting diodes 5 for visual axis detection are turned on according to a signal from the visual axis arithmetic processor 9, thus starting illumination of the eye of the photographer. At this time, if visual axis compensation data of the photographer is not registered in the visual axis arithmetic processor 9, visual axis compensation is started (#222).

Simultaneously with the start of the visual axis compensation, a timer (Ti) incorporated in the visual axis arithmetic processor 9 is started (#223), and the target for visual axis compensation at the display area 51 is turned on according to a signal from the camera controller (not shown) (#224).

At this time, since the camera controller turns on, e.g., the red light-emitting diode 120 assigned to the visual axis compensation, the photographer can recognize based on the ON color that the visual axis compensation is started, and begins to watch the target at the display area 51.

When the timer Ti incorporated in the visual axis arithmetic processor 9 reaches a predetermined time (Ti=T1), eye image data of the photographer at that time is automatically input to the visual axis arithmetic processor 9 (#225). When the eye image data is input to the visual axis arithmetic processor 9, the light-emitting diode 120 corresponding to the display area 51 in the finder is turned off (#226). In the visual axis arithmetic processor 9, the timer Ti is reset (Ti=0) (#227), and it is checked if the eye image data is effective (#228).

If the visual axis arithmetic processor 9 determines that cornea reflected images or iris images cannot be detected based on the eye image data, the timer Ti incorporated in the visual axis arithmetic processor 9 is started again (#223), and the target for visual axis compensation at the display area 51 is turned on (#224). At this time, since the display area 51, which was turned off a little while ago, is turned on again, the photographer can recognize that previous input of the eye image data is incomplete.

On the other hand, if it is determined that the eye image data is effective (#228), the visual axis arithmetic processor 9 calculates a watching point Z1 of the photographer based on the eye image data according to the following relation (#229):

$$Z1 \equiv m*[ARC\ SIN\ \{(Zc1'-Zf1')/\beta/L_{OC}\} \pm \delta] \qquad (13)$$

where $Zc1'$ is the central coordinate (z-direction) of a pupil at that time, $Zf1'$ is the middle-point coordinate (z-direction) of the two cornea reflected images, $L_{OC}$ is the standard distance from a center of curvature O of a cornea 21 to a center C of a pupil 24, and $\delta$ is the standard compensation angle between the optical axis of the eye and the visual axis.

When the watching point Z1 of the photographer corresponding to the display area 51 is calculated (#229), the timer (Ti) incorporated in the visual axis arithmetic processor 9 is started again (#230), and the target for visual axis compensation at the display area 52 is turned on according to a signal from the camera controller (not shown) (#231). The photographer recognizes that the visual axis compensation is started, and begins to watch the target at the display area 52.

When the timer Ti incorporated in the visual axis arithmetic processor 9 reaches a predetermined time (Ti=T1), eye image data of the photographer at that time is automatically input to the visual axis arithmetic processor 9 (#232). When the eye image data is input to the visual axis arithmetic processor 9, the light-emitting diode corresponding to the display area 52 in the finder is turned off (#233). In the visual axis arithmetic processor 9, the timer Ti is reset (Ti=0) (#234), and it is checked if the eye image data is effective (#235).

If the visual axis arithmetic processor 9 determines that cornea reflected images or iris images cannot be detected based on the eye image data, the timer Ti incorporated in the visual axis arithmetic processor 9 is started again (#230), and a series of operations for fetching eye image data corresponding to the display area 52 are executed.

On the other hand, if it is determined that the eye image data is effective (#235), the visual axis arithmetic processor 9 calculates a watching point Z2 of the photographer based on the eye image data according to the following relation (#236):

$$Z2 \equiv m*[ARC\ SIN\ \{(Zc2'-Zf2')/\beta/L_{OC}\} \pm \delta] \quad (14)$$

where $Zc2'$ is the central coordinate (z-direction) of a pupil at that time, $Zf2'$ is the middle-point coordinate (z-direction) of the two cornea reflected images, $L_{OC}$ is the standard distance from the center of curvature O of the cornea 21 to the center C of the pupil 24, and $\delta$ is the standard compensation angle between the optical axis of the eye and the visual axis.

Assuming that the eye of the photographer has a small rotational angle, a formula for compensating for the personal difference of the visual axis can be expressed as:

$$Zn' = A2*Zn + B2 \quad (15)$$

where $Zn$ is the coordinate in the horizontal direction of the watching point calculated using the standard distance $L_{OC}$ and the standard compensation angle $\delta$, $Zn'$ is the coordinate of the watching point after the personal difference is compensated for, and A2 and B2 are the visual axis compensation coefficients.

Since the coordinates of the display areas 51 and 52 on the focusing screen 104 are known, two simultaneous equations associated with the visual axis compensation coefficients A2 and B2 are established on the basis of the coordinate values, and the coordinates of the watching point calculated based on relations (13) and (14). The visual axis arithmetic processor 9 serving as a visual axis compensation arithmetic means solves the two equations, thereby calculating the visual axis compensation coefficients A2 and B2 of the photographer (#237). Furthermore, the visual axis compensation formula ((15)) is determined on the basis of the calculated visual axis compensation coefficients.

When the visual axis compensation formula is determined, an operation for checking if the visual axis compensation is normally performed is executed. The timer Ti incorporated in the visual axis arithmetic processor 9 is started again (#238), and the target for visual axis compensation at the display area 53 is turned on according to a signal from the camera controller (#239).

When the photographer begins to watch the display area 53, and the timer Ti incorporated in the visual axis arithmetic processor 9 reaches a predetermined time (Ti=T1), eye image data of the photographer at that time is automatically input to the visual axis arithmetic processor 9 (#240). When the eye image data is input to the visual axis arithmetic processor 9, the light-emitting diode corresponding to the display area 53 in the finder is turned off (#241). In the visual axis arithmetic processor 9, the timer Ti is reset (Ti=0) (#242), and it is checked if the eye image data is effective (#243).

If the visual axis arithmetic processor 9 determines that cornea reflected images or iris images cannot be detected based on the eye image data, the timer Ti incorporated in the visual axis arithmetic processor 9 is started again (#238), and a series of operations for fetching eye image data corresponding to the display area 53 are executed.

On the other hand, if it is determined that the eye image data is effective (#243), the visual axis arithmetic processor 9 calculates a watching point Z3 of the photographer based on the eye image data according to the following relation (#244):

$$Z3 \equiv A2*m*[ARC\ SIN\ \{(Zc3'-Zf3')/\beta/L_{OC}\} \pm \delta] + B2 \quad (16)$$

where $Zc3'$ is the central coordinate (z-direction) of the pupil, and $Zf3'$ is the middle-point coordinate (z-direction) of the two cornea reflected images.

Since a coordinate $Z3'$ of the display area 53 on the focusing screen 104 is known, the coordinate value is compared with the coordinate Z3 of the watching point compensation-calculated based on relation (16) (#245). When the coordinate $Z3'$ of the display area 53 does not coincide with the coordinate Z3 of the watching point, if the visual axis compensation data have already been registered, these data are deleted (#246), and an alarm indication (e.g., flickering indication at the display area 53 for a predetermined period of time) indicating that the visual axis compensation cannot be normally performed, is made (#247). Thereafter, the visual axis compensation is started again.

On the other hand, when the coordinate $Z3'$ of the display area 53 and the coordinate Z3 of the watching point are compared with each other, and these two values almost coincide with each other (#245), the visual axis compensation formula (equation (15)) obtained based on the visual axis compensation coefficients is registered, as visual axis compensation data, in the visual axis arithmetic processor 9 serving as a visual axis compensation data storage means (#248). At this time, data of the photographer who performed the visual axis compensation can also be simultaneously stored in the visual axis arithmetic processor 9. In this manner, visual axis compensation need not be repeated once the visual axis compensation is performed.

When the visual axis compensation data are registered in the arithmetic processor 9, flickering indication of the display areas 51, 52, and 53 in the finder is performed for a predetermined period of time so as to inform to the photographer that the visual axis compensation is completed (#249). Thereafter, the visual axis compensation mode is canceled (#250). The device then make a transition to a visual axis input mode (#251). In the visual axis input mode, the visual axis of the photographer can be detected with high precision using the previously calculated visual axis compensation data. In this manner, information according to the photographer's will, e.g., the position of an object to be focused and photographed by the photographer, can be input to the camera on the basis of the visual axis of the photographer.

When the photographer turns on the power switch of the camera, and sets the visual input mode (#220), if the visual axis compensation data have already been registered in the camera (#222), an operation for checking if the registered visual axis compensation data are effective for the photographer is executed (#238 to #245).

When the photographer turns on the power switch of the camera, and sets the visual input mode, if the visual axis compensation data have already been registered in the camera, the visual axis input mode may be immediately started without executing the visual axis compensation.

In this embodiment, the visual axis compensation formula is defined by a linear function like in equation (15), but may be defined by a logarithmic function as follows:

$$Zn'=A2* \text{LOG}(Zn)+B2 \qquad (17)$$

Figure 13:
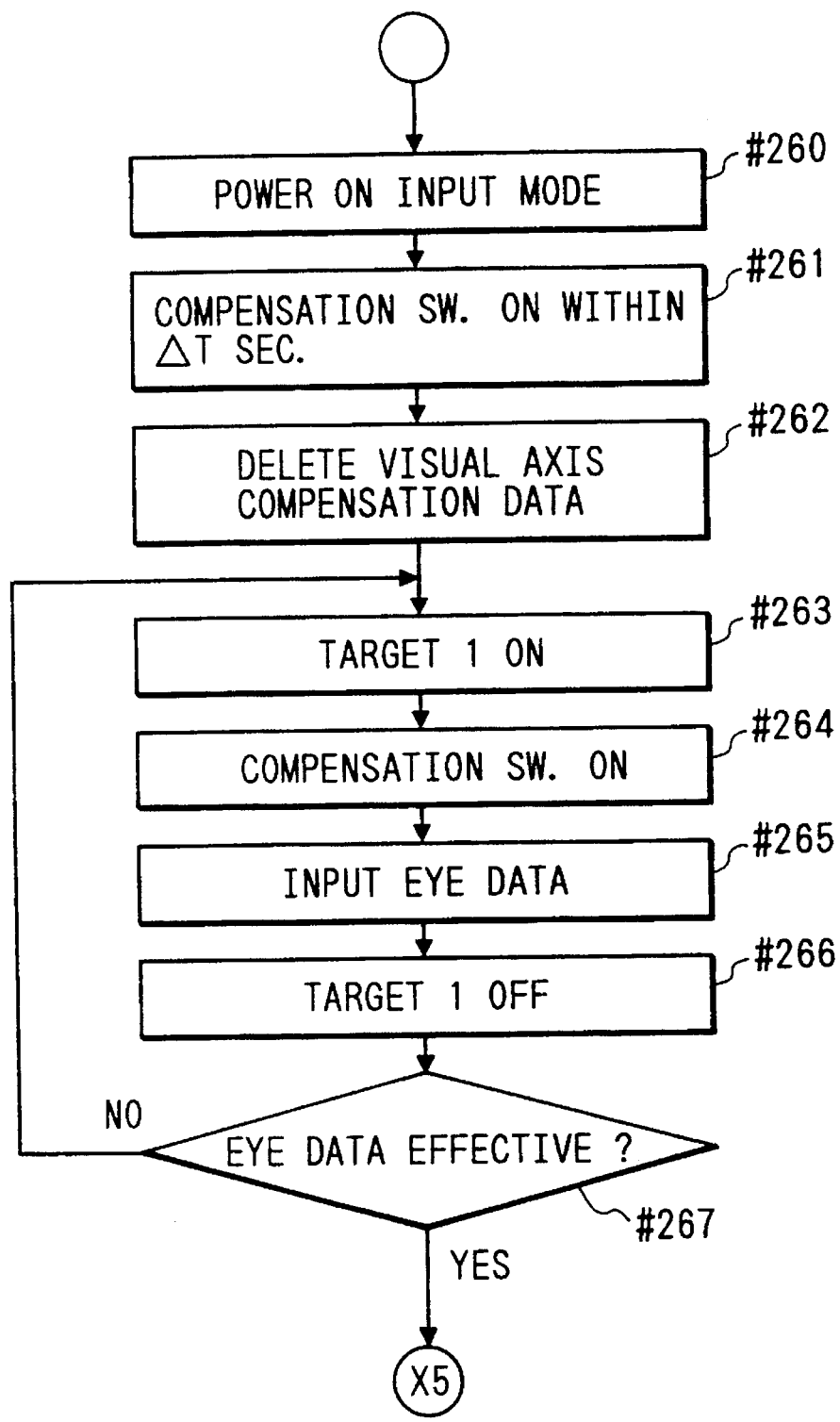
FIG. 13 is a flow chart showing visual axis compensation of the third embodiment.
Figure 14:
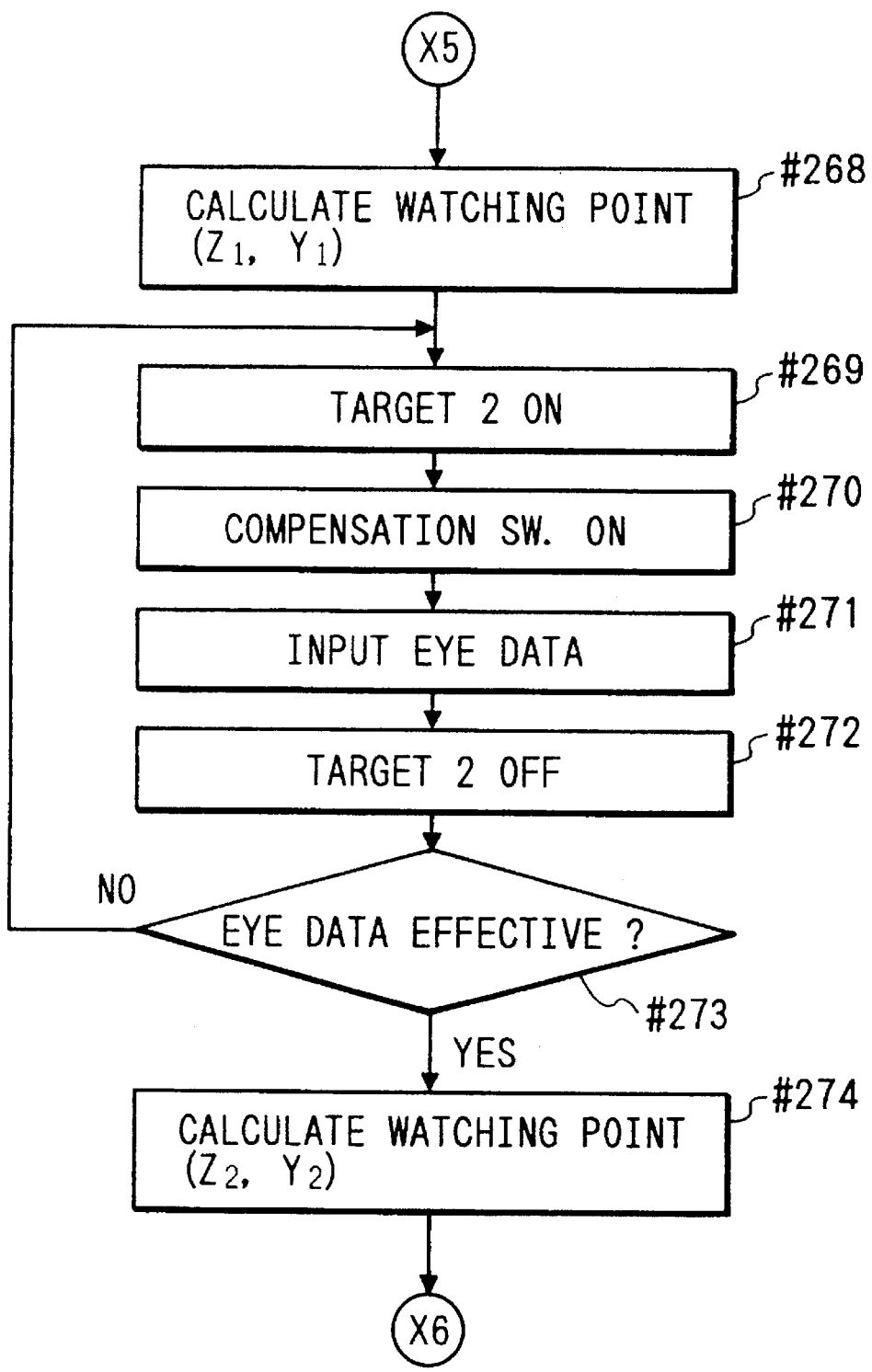
FIG. 14 is a flow chart showing visual axis compensation of the third embodiment.
Figure 15:
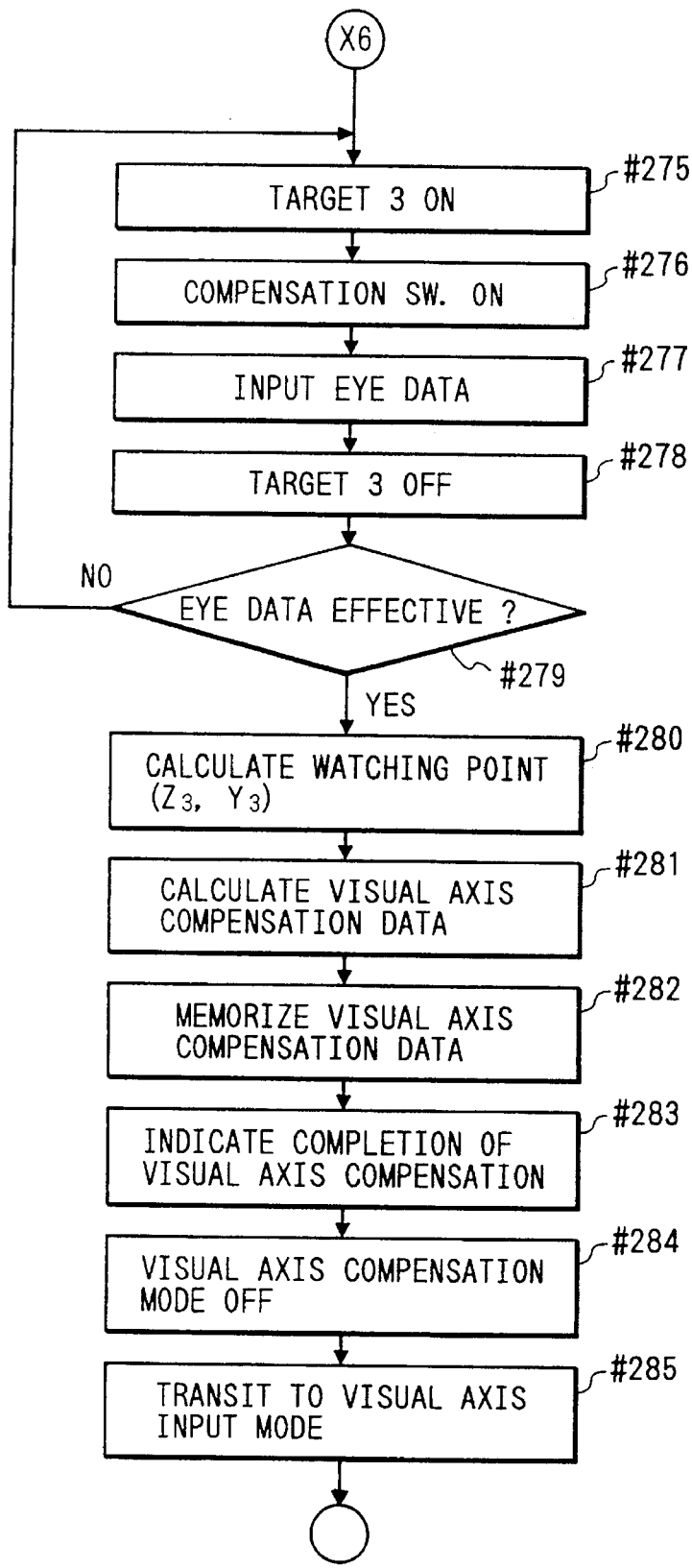
FIG. 15 is a flow chart showing visual axis compensation of the third embodiment.
Figure 16:
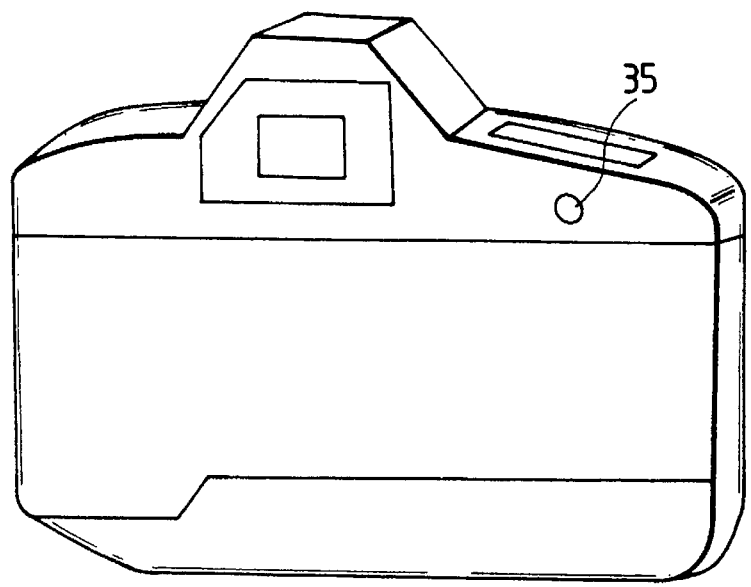
FIG. 16 is a rear perspective view of the third embodiment wherein the present invention is applied to a single-lens reflex camera.
Figure 17:
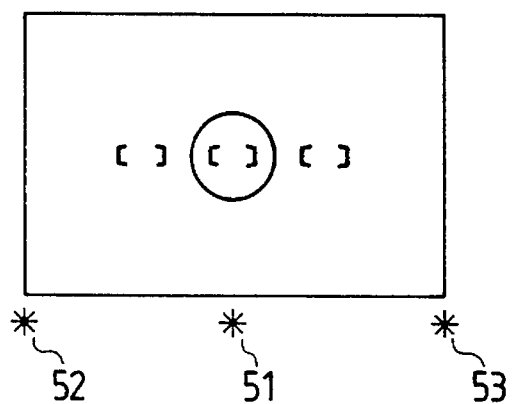
FIG. 17 is a view showing a visual field in a finder in FIG. 16.
Figure 18A:
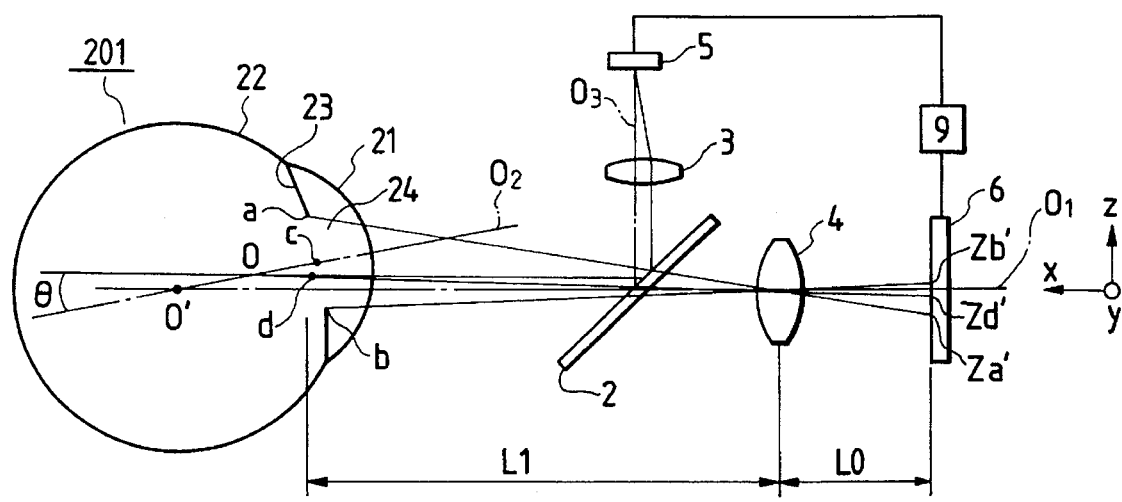
FIG. 18A is a schematic view of a conventional visual axis detection optical system.
Figure 18B:
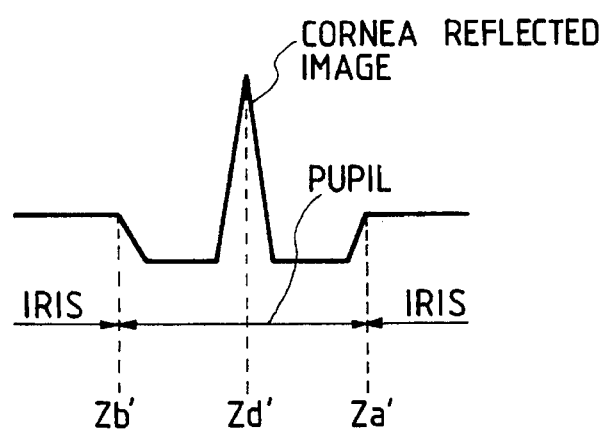
FIG. 18B is a graph showing the output intensity of a photoelectric transducer array shown in FIG. 18A.
Figure 19:
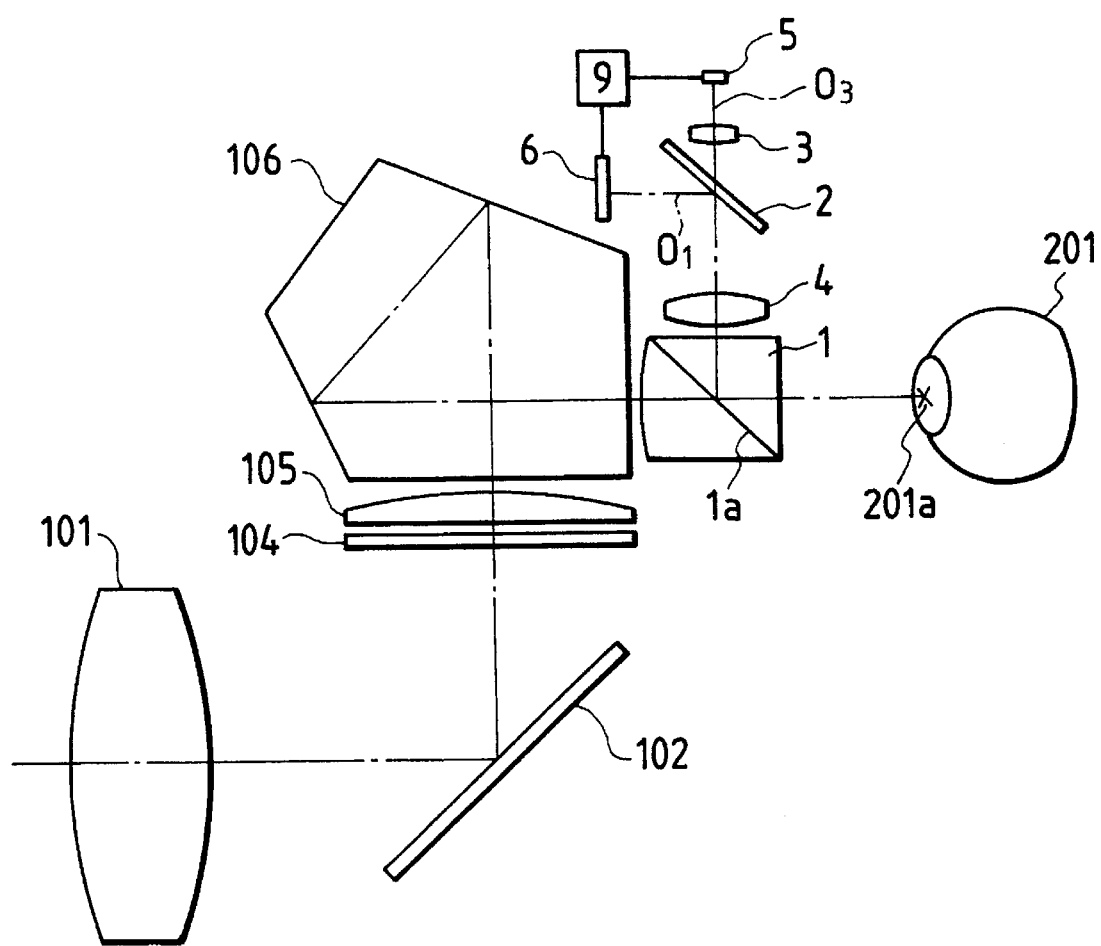
FIG. 19 is a schematic view showing the principal part of a single-lens reflex camera having a conventional visual axis detection device.

FIG. 16 is a rear view showing the outer appearance of a camera according to the third embodiment of the present invention, FIG. 17 is a view showing the visual field in the finder in the third embodiment, and FIGS. 13, 14, and 15 are flow charts of the third embodiment.

Note that the visual axis detection device of this embodiment is the same as that shown in FIG. 2. In FIG. 16, a visual axis compensation switch 35 also serves as a visual axis compensation execution switch.

In this embodiment, as shown in FIG. 17, three targets (targets 51, 52, and 53) for visual axis compensation each comprising a liquid crystal element with back light or a light-emitting diode as an intra-finder display means are arranged outside the visual field of a finder, and the display/non-display state of these targets is controlled by a camera controller (not shown).

The visual axis compensation method of this embodiment will be described below with reference to the flow charts of visual axis compensation shown in FIGS. 13 to 15.

When a photographer turns on a power switch (not shown), and sets a visual axis input mode (#260), an infrared light-emitting diode for visual axis detection is turned on according to a signal from a visual axis arithmetic processor 9 (not shown), thus starting illumination of the eye of the photographer. Furthermore, when the photographer continuously depresses the visual axis compensation switch 35 for a predetermined period of time (δT time), the device makes the transistion to a visual axis compensation mode (#261). At this time, if visual axis compensation data have already been registered in the visual axis arithmetic processor 9, the registered visual axis compensation data are deleted (#262).

The target 51 for visual axis compensation located at the center in the horizontal direction outside the visual field of the finder is turned on according to a signal from the camera controller (#263). When the photographer depresses the visual axis compensation switch 35 while watching the target 51 (#264), eye image data of the photographer at that time is input to the visual axis arithmetic processor 9 (#265). When the eye image data is input to the visual axis arithmetic processor 9, the target 51 outside the visual field of the finder is turned off (#266).

Subsequently, the visual axis arithmetic processor 9 checks if the eye image data is effective (#267). If the visual axis arithmetic processor 9 determines that cornea reflected images or iris images cannot be detected based on the eye image data, the target 51 is turned on again (#263) to start re-fetching of eye image data. Since the target 51, which was turned off a little while ago, is turned on again, the photographer can recognize that previous input of the eye image data is incomplete.

On the other hand, if it is determined that the eye image data is effective (#267), the visual axis arithmetic processor 9 calculates a watching point Z1 of the photographer based on the eye image data according to relation (13) described above (#268).

When the watching point Z1 of the photographer corresponding to the target 51 is calculated (#268), the target 52 arranged at the left side in the horizontal direction outside the visual field of the finder is turned on according to a signal from the camera controller (#269). The photographer recognizes that the visual axis compensation is started, and begins to watch the target 52. When the photographer depresses the visual axis compensation switch 35 while watching the target 52 (#270), eye image data of the photographer at that time is input to the visual axis arithmetic processor 9 (#271). When the eye image data is input to the visual axis arithmetic processor 9, the target 52 outside the visual field of the finder is turned off (#272). Subsequently, in the visual axis arithmetic processor 9, it is checked if the eye image data is effective (#273).

If the visual axis arithmetic processor 9 determines that cornea reflected images or iris images cannot be detected based on the eye image data, the target 52 is turned on again (#269) to start re-fetching of eye image data.

If it is determined that the eye image data is effective (#273), the visual axis arithmetic processor 9 calculates a watching point Z2 of the photographer based on the eye image data according to relation (13) described above (#274).

When the watching point Z2 of the photographer corresponding to the target 52 is calculated (#274), the target 53 arranged at the right side in the horizontal direction outside the visual field of the finder is turned on according to a signal from the camera controller (#275). Thereafter, the same operations as described above are executed to calculate a watching point Z3 of the photographer corresponding to the target 53 (#275 to #280).

Assuming that the eye of the photographer has a small rotational angle, a formula for compensating for the personal difference of the visual axis can be expressed as:

$$Zn'=A3*Zn+B3$$

where Zn is the coordinate in the horizontal direction of the watching point calculated using the standard distance $L_{OC}$ and the standard compensation angle δ, Zn' is the coordinate of the watching point after the personal difference is compensated for, and A3 and B3 are the visual axis compensation coefficients.

Since the coordinates of the targets 51, 52, and 53 on the focusing screen 104 are known, the visual axis arithmetic processor 9 serving as a visual axis compensation arithmetic means calculates visual axis compensation coefficients A3 and B3 on the basis of these coordinate values, and the already calculated coordinates of the watching points corresponding to the three targets (#281). Furthermore, a visual axis compensation formula is determined based on the visual axis compensation coefficient.

When the visual axis compensation formula is determined, it is registered in the visual axis arithmetic processor 9 serving as a visual axis compensation data storage means (#282). At this time, data of the photographer who performed the visual axis compensation can also be simultaneously stored in the visual axis arithmetic processor 9. In this manner, visual axis compensation need not be repeated once the visual axis compensation is performed.

When the visual axis compensation data are registered in the arithmetic processor 9, flickering indication of the targets 51, 52, and 53 in the finder is performed for a predetermined period of time so as to inform the photographer that the visual axis compensation is completed (#283). Thereafter, the visual axis compensation mode is canceled (#284). The device then makes the transition to a visual axis input mode (#285). In the visual axis input mode, the visual axis of the photographer can be detected with high precision using the previously calculated visual axis compensation data. In this manner, information according to the photographer's will, e.g., the position of an object to be focused and photographed by the photographer, can be input to the camera on the basis of the visual axis of the photographer.

Furthermore, it is effective that the visual axis compensation switch 35 serves as a visual axis input switch for inputting visual axis information at an instance when the switch is depressed, when the visual axis input mode is started after completion of the visual axis compensation.

In this embodiment, the visual axis compensation formula is defined by a linear function, but may be defined by a logarithmic function as follows:

$$Zn' = A3 * \text{LOG}(Zn) + B3$$

At this time, a compensation formula to be adopted may be determined upon comparison between correlation coefficients obtained by the two compensation formulas.

The visual axis compensation formula may be defined by a quadratic function as follows, and may be calculated:

$$Zn' = A3 * ZnZn + B3 * Zn + C3$$

According to the present invention, an optical apparatus having a visual axis detection device with the following effects can be realized. That is, when a rotational angle as an angle defined between the optical axis of a finder system, and the optical axis of the eye of an observer is detected, and the visual axis of the observer is calculated based on the rotational angle, a detection error of the visual axis caused by a personal difference such as a difference in size of the eye can be automatically corrected by utilizing a visual axis compensation means comprising, e.g., a visual axis compensation execution switch, an intra-finder display means, a visual axis compensation arithmetic means, a visual axis compensation data storage means, a compensation confirmation means, and the like, and visual axis detection can be performed with high precision.

What is claimed is:

1. An apparatus including:
   conversion means for receiving light reflected by an eye, and converting the light into an electrical signal;
   generating means for generating information relating to a visual point observed by an observer on the basis of the electrical signal;
   optical means having a lens through which the observer observes a view field;
   setting means for setting a calibration mode;
   display means for displaying a mark at a predetermined position in or near the view field in response to a setting operation of said setting means;
   observer actuated means for starting said generating means in response to an action by the observer;
   calculation means for calculating compensation information for causing the information generated by said generating means relating to the visual point observed by the observer when he or she watches the mark to substantially coincide with position information of the mark; and
   alarm means for indicating to the observer that the compensation information is not correct in a case where the compensation information is not correct.

2. An apparatus according to claim 1, wherein a plurality of marks are arranged in said view field, and are also used as marks for focusing indication.

3. An apparatus according to claim 1, further including storage means for storing the compensation information.

4. An apparatus according to claim 1, wherein said display means is adapted to display a plurality of marks, and said apparatus further includes control means for controlling said display means to display one of said plurality of marks, turning off the displayed mark, and thereafter, displaying another mark.

5. An apparatus according to claim 1, wherein the mark is displayed in the view field of said optical means.

6. An apparatus according to claim 1, wherein the mark is displayed outside the view field of said optical means.

7. A camera according to claim 1, wherein the plurality of marks also serve to display the in-focus state of said optical means.

8. A camera according to claim 7, wherein said display means displays calibration information differently from displaying the in-focus state of said optical means.

9. A camera according to claim 8, wherein one of the plurality of marks flickers during a calibration display and is continuously projected during an in-focus state display.

10. A camera including:
    conversion means for receiving light reflected by an eye, and converting the light into an electrical signal;
    generating means for generating information relating to a visual point observed by an observer on the basis of the electrical signal;
    focusing state detection means for detecting a focusing state of a phototaking lens, said focusing state detecting means including:
    a) a field mask arranged at a position equivalent to a sensitive surface, and having a plurality of openings,
    b) lens means, having a plurality of lens portions, for relaying light emerging from said field mask,
    c) a sensor, having a plurality of light-receiving portions, for converting light from said lens means into an electrical signal; and
    d) first processing means for signal-processing the electrical signal from said sensor so as to detect a focusing state;
    display means for displaying a plurality of marks at a plurality of positions in or near a view field;
    observer actuated means for starting said generating means in response to an action by the observer;
    calculation means for calculating compensation information for causing information relating to each visual point observed by the observer generated by said generating means to substantially coincide with position information of one of the plurality of marks;
    alarm means for indicating to the observer that the compensation information or the calculation is not correct in a case where said compensation information or the calculation is not correct;
    second processing means for processing the electrical signal from said conversion means and the compensation information so as to precisely detect the visual point observed by the observer; and
    producing means for producing the signal to be processed by said first processing means with respect to the visual point detected by said second processing means.

11. A camera according to claim 10, further including control means for controlling display of the plurality of marks, said control means displaying one mark, and then displaying another mark.

12. A camera according to claim 10, wherein the marks are also used as marks for focusing indication.

13. A camera according to claim 10, wherein the plurality of marks are displayed in the view field.

14. A camera according to claim 10, wherein the plurality of marks are displayed outside the view field.

15. A camera according to claim 12, further comprising display means for displaying a calibration state of said camera differently from displaying an in-focus state of said camera.

16. A camera according to claim 15, wherein said display means displays one of the plurality of marks in a flickering manner during a calibration display and continuously projects the one of the plurality of marks for displaying an in-focus state of said camera.

17. An apparatus according to claim 10, wherein said observer actuated means is a release switch.

18. An apparatus including conversion means for receiving light reflected by an eye, and converting the light into an electrical signal;

optical means having a lens through which the observer observes a view field;

setting means for setting a calibration mode of said apparatus;

display means for displaying a mark at a predetermined position in or near the view field in response to a setting operation of said setting means;

observer actuated operating means for performing an operation in response to an action by the observer;

calculating means for inputting the electrical signal at once when said operating means is operated to execute a calculation for making a view point of the observer correspond to a position of the mark; and alarm means for indicating to the observer that the calculation is not correct when the calculation is not correct.

* * * * *

UNITED STATES PATENT AND TRADEMARK OFFICE
CERTIFICATE OF CORRECTION

PATENT NO. : 5,598,248
DATED : January 28, 1997
INVENTOR(S) : AKIHIKO NAGANO, ET AL.

It is certified that error appears in the above-indentified patent and that said Letters Patent is hereby corrected as shown below:

COLUMN 3:

Line 5, "an" should be deleted.

Line 40, "size 1 of" should read --sized--.

COLUMN 4:

Line 6, "persing" should read --performing--.

COLUMN 7:

Line 10, "a" should read --the--.

UNITED STATES PATENT AND TRADEMARK OFFICE
CERTIFICATE OF CORRECTION

PATENT NO. : 5,598,248           Page 2 of 7
DATED      : January 28, 1997
INVENTOR(S): AKIHIKO NAGANO, ET AL.

It is certified that error appears in the above-indentified patent and that said Letters Patent is hereby corrected as shown below:

COLUMN 8:

Line 7, "$\theta \approx \text{ARC SIN}\{(Zc'-Zf')/\beta/(A1^* L_{oc})\}\ldots(8)$" should read --$\theta \approx \text{ARCSIN}\{(Zc'-Zf')/\beta/(A1^* L_{oc})\}\ldots(8)$--.

COLUMN 9:

Line 53,

"$Z1 \approx m^*[\text{ARC SIN}\{(Zc1'-Zf1')/\beta/(A1^* L_{oc})\} \pm (B1^* \delta)]\ldots(11)$"

should read

--$Z1 \approx m^*[\text{ARCSIN}\{(Zc1'-Zf1')/\beta/(A1^* L_{oc})\} \pm (B1^* \delta)]\ldots(11)$--.

UNITED STATES PATENT AND TRADEMARK OFFICE
CERTIFICATE OF CORRECTION

PATENT NO. : 5,598,248
DATED : January 28, 1997
INVENTOR(S) : AKIHIKO NAGANO, ET AL.

It is certified that error appears in the above-indentified patent and that said Letters Patent is hereby corrected as shown below:

COLUMN 10:

Line 15,

"$Z2 \simeq m^*[ARC\ SIN\ \{Zc2'-Zf2'\}/\beta/(A1^*L_{oc}\}\pm(B1\delta)]....(12)$"

should read

--$Z2 \simeq m^*[ARCSIN\{Zc2'-Zf2'\}/\beta/(A1^*L_{oc})\}\pm(B1^*\delta)]..(12)$--.

Line 39, "to" (second occurrence) should be deleted.

UNITED STATES PATENT AND TRADEMARK OFFICE
CERTIFICATE OF CORRECTION

PATENT NO. : 5,598,248
DATED : January 28, 1997
INVENTOR(S) : AKIHIKO NAGANO, ET AL.

It is certified that error appears in the above-indentified patent and that said Letters Patent is hereby corrected as shown below:

COLUMN 11:

Line 3, "of" (first occurrence) should read --of the--.

COLUMN 12:

Line 47,

"$Z1 = m^*[ARC\ SIN\{(Zcl'-Zfl')/\beta/L_{oc}\} \pm \delta]\ldots(13)$"

should read

--$Z1 = m^*[ARCSIN\{(Zcl'-Zfl')/\beta/L_{oc}\} \pm \delta]\ldots(13)$--.

UNITED STATES PATENT AND TRADEMARK OFFICE
CERTIFICATE OF CORRECTION

PATENT NO. : 5,598,248
DATED : January 28, 1997
INVENTOR(S) : AKIHIKO NAGANO, ET AL.

It is certified that error appears in the above-indentified patent and that said Letters Patent is hereby corrected as shown below:

COLUMN 13:

Line 19,

"$Z2 = m^*[\text{ARC SIN } \{(Zc2'-Z/f2')/\beta/L_{oc}\} \pm \delta]\ldots(14)$"

should read

--$Z2 = m^*[\text{ARCSIN}\{(Zc2'-Zf2')/\beta/L_{oc}\} \pm \delta]\ldots(14)$--.

UNITED STATES PATENT AND TRADEMARK OFFICE
CERTIFICATE OF CORRECTION

PATENT NO. : 5,598,248
DATED : January 28, 1997
INVENTOR(S) : AKIHIKO NAGANO, ET AL.

It is certified that error appears in the above-indentified patent and that said Letters Patent is hereby corrected as shown below:

COLUMN 14:

Line 14,

"$Z3 = A2^* m^* [ARC\ SIN\ \{(Zc3'-Zf3')/\beta/L_{oc}\} \pm \delta] + B2 \ldots (16)$"

should read

--$Z3 = A2^* m^* [ARCSIN\{(Zc3'-Zf3')/\beta/L_{oc}\} \pm \delta] + B2 \ldots (16)$--.

Line 47, "to" (second occurrence) should be deleted.

UNITED STATES PATENT AND TRADEMARK OFFICE
CERTIFICATE OF CORRECTION

PATENT NO. : 5,598,248
DATED : January 28, 1997
INVENTOR(S) : AKIHIKO NAGANO, ET AL.

It is certified that error appears in the above-indentified patent and that said Letters Patent is hereby corrected as shown below:

COLUMN 17:

Line 20,

"$Zn'=A3^*ZnZn+B3^*Zn+C3$" should read

--$Zn'=A3^*Zn^*2+B3^*Zn+C3$--.

COLUMN 19:

Line 10, "An apparatus" should read --A camera--.

Line 12, "including" should read --including:--.

Signed and Sealed this

Nineteenth Day of August, 1997

BRUCE LEHMAN

*Attest:*

*Attesting Officer*     *Commissioner of Patents and Trademarks*